United States Patent
Song et al.

(10) Patent No.: US 10,725,316 B2
(45) Date of Patent: Jul. 28, 2020

(54) OPTICAL STEREOSCOPIC DISPLAY SCREEN FOR NAKED EYE VIEWING

(71) Applicants: Jay Song, Aliso Viejo, CA (US); Lishang Zhou, Beijing (CN)

(72) Inventors: Jay Song, Aliso Viejo, CA (US); Lishang Zhou, Beijing (CN)

(*) Notice: Subject to any disclaimer, the term of this patent is extended or adjusted under 35 U.S.C. 154(b) by 0 days.

(21) Appl. No.: 15/436,818

(22) Filed: Feb. 19, 2017

(65) Prior Publication Data
US 2017/0242260 A1 Aug. 24, 2017

Related U.S. Application Data

(60) Provisional application No. 62/298,145, filed on Feb. 22, 2016.

(51) Int. Cl.
*G02B 30/27* (2020.01)
*G02B 3/08* (2006.01)
*G02B 3/06* (2006.01)
*G02B 30/40* (2020.01)

(52) U.S. Cl.
CPC ............... *G02B 30/27* (2020.01); *G02B 3/06* (2013.01); *G02B 3/08* (2013.01); *G02B 30/40* (2020.01)

(58) Field of Classification Search
CPC ........... G02B 27/2221; G02B 27/2214; G02B 30/27; G01S 7/20; G01S 7/6245; G03C 2009/08
See application file for complete search history.

(56) References Cited

U.S. PATENT DOCUMENTS

| 6,788,274 B2 * | 9/2004 | Kakeya | G02B 27/2214 345/7 |
| 2002/0030887 A1 * | 3/2002 | Hamagishi | H04N 13/305 359/463 |
| 2011/0242442 A1 * | 10/2011 | Lee | G02B 30/27 349/15 |
| 2017/0212360 A1 * | 7/2017 | Yang | G02B 25/007 |
| 2018/0107010 A1 * | 4/2018 | Wang | G02B 27/26 |

* cited by examiner

*Primary Examiner* — Charlie Y Peng

(57) ABSTRACT

The present invention provides a glasses-free optical 3D stereoscopic display screen comprising a conventional display screen and an optical element assembly wherein the optical element assembly includes at least one optical element and utilizes refraction effects, when an ordinary 2D image shown on the conventional display screen is viewed by a viewer, refraction of the optical element assembly induces the viewer's left eye to perceive a left eye offset image and right eye to perceive a right eye offset image of the 2D image and cause the viewer to perceive a 3D stereoscopic image which falls within one of the following viewing modes: (i) positive parallax hyperstereo viewing mode, (ii) positive parallax hypostereo viewing mode, (iii) negative parallax hyperstereo viewing mode, and, (iv) negative parallax hypostereo viewing mode.

11 Claims, 29 Drawing Sheets

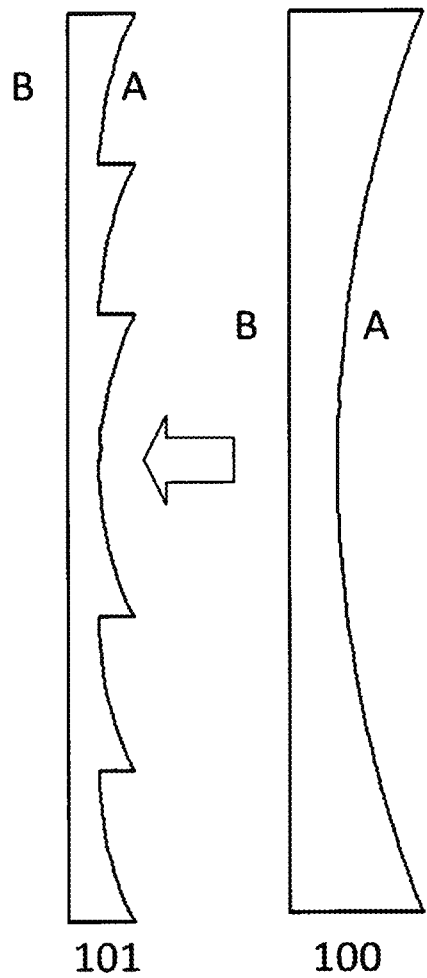
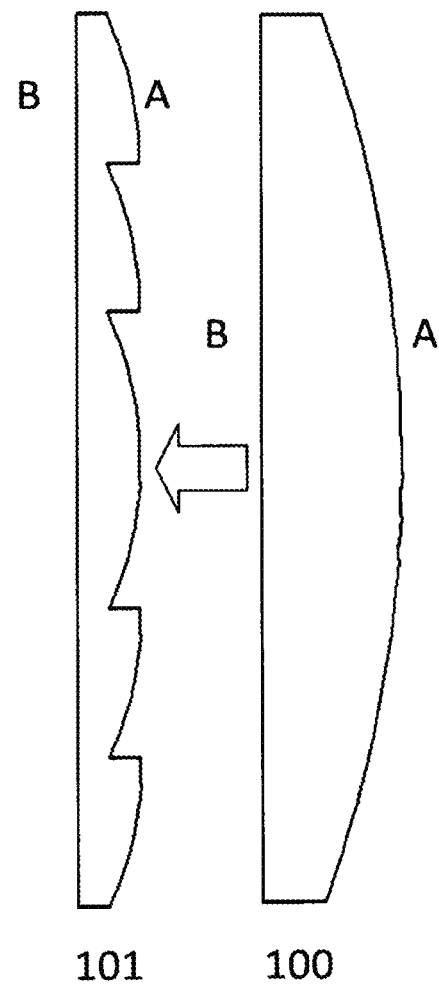
FIG. 6(a)
PRIOR ART
FIG. 6(b)
PRIOR ART

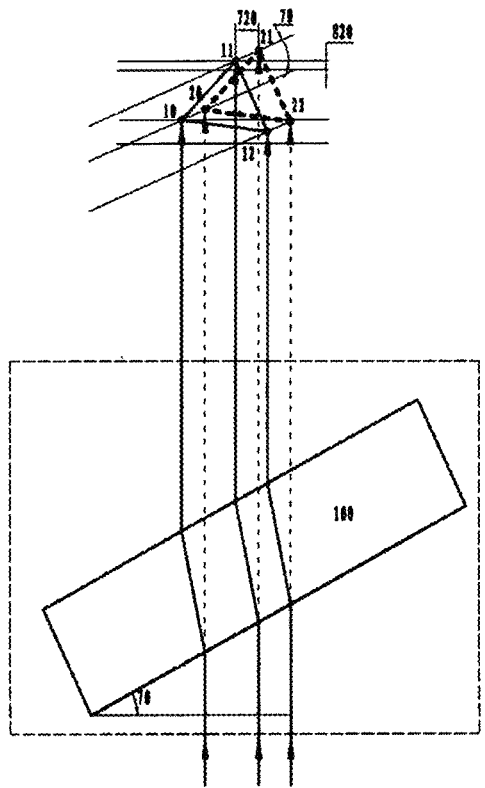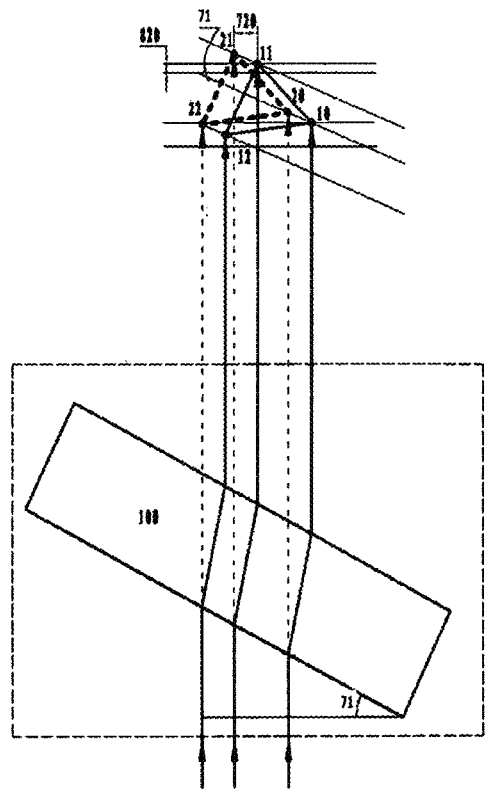
FIG. 10(a)
PRIOR ART
FIG. 10(b)
PRIOR ART

|  | □1 | □2 | □3 | □4 | □5 | □······ |  | □Y |
|---|---|---|---|---|---|---|---|---|
| 1□ | 11 | 12 | 13 | 14 | 15 | ············ | | 1Y |
| 2□ | 21 | 22 | 23 | 24 | 25 | ············ | | 2Y |
| 3□ | 31 | 32 | 33 | 34 | 35 | ············ | | 3Y |
| ···□ | ⋮ | ⋮ | ⋮ | ⋮ | ⋮ | | | •Y |
|  |  |  |  |  |  | | | ••Y |
| x□ | X1 | X2 | X3 | X4 | X5 | X• | X•• | XY |

FIG. 29

# OPTICAL STEREOSCOPIC DISPLAY SCREEN FOR NAKED EYE VIEWING

CLAIM OF BENEFIT OF FILING DATE

This application claims the benefit of the filing date of U.S. Provisional Application Ser. No. 62/298,145 titled "Glasses-Free Optical 3D Stereoscopic Display" filed on Feb. 22, 2016, which is incorporated herein by reference for all purposes.

FIELD OF THE INVENTION

The present invention relates to optical stereoscopic display screen. More particularly, the present invention relates to optical stereoscopic display screen that can perceive three-dimensional ("3D") stereoscopic vision when naked eye viewing a two-dimensional ("2D") content on a conventional display screen.

BACKGROUND OF THE INVENTION

Pursuing "augmented reality" and "immersion" screen viewing means of color vividness, high definition display and stereoscopic display. Current display technology has increasingly achieved perfection on vivid color and high definition display, but stereoscopic display. Existing stereoscopic display for naked eye viewing is represented by technical means of non-holographic display and holographic display. Non-holographic display is divided into spatial pattern, meaning of technical solutions by parallax barrier method, lenticular lens method, volumetric matrix method, micro-lens projection method, etc. and time pattern, meaning of technical solutions by micro-retarded plate method, pointing source method, etc. Besides to sacrifice brightness and resolution in exchange for technical means, the downsides of current non-holographic display are: (a) limitation on viewing angle; (b) reduced brightness and resolution; (c) eyes having to maintain the same elevation as the screen; (d) lack of consecutive scenes; (e) crosstalk phenomenon; (f) high cost; (g) less matured contents; (h) viewer dizziness and nausea. The holographic display means of technical solutions by lens holographic method, reflection holographic method, synthetic holographic method, volumetric holographic method, etc., currently, the method of holographic display experiences technical difficulties for wide range of applications.

Human eyes have 3D stereoscopic vision of objects in natural space. The eyes' close side-by-side positioning allows each eye to take a view of the same area of an object from a slightly different angle and thereby creating two offset images known as binocular disparity. The natural 3D stereoscopic vision of human is provided by his brain's combination of two offset images, the brain matching up the similarities and adding in the small differences of the two offset images. The small differences between the two offset images allow the brain to experience 3D stereoscopic perception. Generally, when viewing an object in real space, the viewer's eyes focus and converge onto the object simultaneously; the binocular disparity thereby informs his brain to perceive the depth and location of the object. When viewing a 3D content on a conventional display screen, such as a movie screen, a television screen, a computer screen, a tablet screen, a game console screen, a billboard screen, a portable device screen, a phone screen, or the like, the viewer's eyes behave differently than they do in nature in that they focus on the display screen but converge onto the object appearing in the viewing space and forming parallax. Basically, parallax is a displacement of difference in the apparent position of an object viewed along the two different lines of sight. The parallax informs the viewer's brain that the object viewed on 2D display screen is stereoscopic. In addition, in the viewing space, when image of the viewed object appears to exist between the viewer and the display screen, this effect is known as negative parallax; when image of the viewed object appears to exist behind the conventional display screen, this effect is known as positive parallax. When viewing a 2D content on a conventional display screen, the viewer's eyes also behave differently than he does in nature in that the viewer's eyes focus and converge on the display screen, non-parallax or zero parallax informs the viewer's brain that the objects viewed on the display screen is a 2D image. The zero parallax is effectively strong so as totally weaken the sense of spatial perception despite spatial messages such as space perspective, relative location and relative motion exist, which is known as negative effect to 3D stereoscopic perception by zero parallax. Thus, in order to reproduce spatial perception when viewing a 2D content on a conventional display screen, the technical approach is to eliminate the negative effect by zero parallax.

Human eyes have features of binocular accommodation, vergence, and parallax. For a captured scene, the accommodation maps the scene onto the viewer's retina; the vergence combines and processes the left-eye offset image on the left-eye retina and the right-eye offset image on the right-eye retina into one image while avoiding a ghosting effect; the parallax further induces the viewer's perception of spatial location and spatial depth of the scene. While the left-eye image and right-eye images appear certain differences or experiences a spatial displacement, parallax will induce viewer's sense of 3D stereoscopic perception.

FIG. 1 illustrates the imaging principle of 3D stereoscopic vision when viewing objective images on a conventional display screen 4, as well as the effect of image plunge-in or pop-out of the conventional display screen 4. Assuming the interocular distance (the separation space of the eyes) is 1, the conventional display screen 4 is in parallel with the eyes, when the left-eye "L" and the right-eye "R" view the spatial object 30, the left-eye offset image and the right-eye offset image on screen plane 4 are located at corresponding locations 31 and 32. To connect the middle point 2 of the eyes and the spatial object 30, the intersection on the screen plane 4 is 3. For 3D stereoscopic viewing, in one scenario, the binocular accommodation makes the eyes focus onto screen plane 4, the binocular vergence merges the left-eye image 31 and the right-eye image 32 into one image 3. As brain is used to vergence effect, it automatically combines the left-eye offset image 31 and the right-eye offset image 32 into the spatial image 30. Comparing to the image 3 on the screen plane 4, the spatial image 30 possesses spatial depth, thus, it results in 3D stereoscopic vision. The spatial image 30 falls behind the screen 4, it represents the image 3 plunge-in the screen plane 4 (positive parallax). In another scenario, if the image 41 is on the left-eye retina (41=32) and the image 42 is on the right-eye retina (42=31), the brain automatically combines the two images into the spatial image 40. Comparing to the image 3 on the screen plane 4, the spatial image 40 falls in front of screen 4 and represents the image 3 pop-out of the screen plane 4 (negative parallax). In other words, when viewing the spatial object 40, the left-eye offset image and the right-eye offset image on the screen plane 4 are located at the corresponding location 41 and 42, which are defocused (scattered) images. As conventional preparation of 3D stereoscopic content do not take into account the defocusing issue, when making the left eye image 41 and the right eye image 42 on the screen plane 4 by utilizing the focused images 31 and 32, the consequence to viewer's brain is that it extreme lacks of adaptation and causes the viewer dizziness and nausea. Thus, the negative parallax viewing mode is rarely adopted for 3D stereoscopic displays.

Conventional preparation of 3D stereoscopic content is usually divided into pre-production and post-production phases. In the pre-production phase, two designated stereoscopic cameras are used to film the content. In post-production phase, the filmed content is then digitally processed in accordance with the principles of spatial parallax. Usually, the process involves changing the objects in multi-layer of depth of viewing field (normally 4-8 layers) in order to strengthen the 3D effect. This post-production process is also used to convert 2D content into 3D stereoscopic content.

Conventional glasses-free stereoscopic display experiences issues of technical difficulties, less matured 3D contents, crosstalk phenomenon, as well as significantly reducing brightness and resolution, it often causes viewers to suffer eyestrain, headache, dizziness and nausea due to over parallax, excessive convergence and/or divergence. Moreover, frequently switching between divergence and convergence may also cause viewer to perceive deformity, distortion and ghosting of the viewed content.

SUMMARY OF INVENTION

The present invention is the extension of technical principle of the patent "Adjustable Optical Stereo Glasses" U.S. Ser. No. 14/637,439 and WO2016140655 by the inventors.

The present invention solves the above mentioned issues and provides optical stereoscopic display screen that establish a sense of 3D stereoscopic perception when naked eye viewing a 2D content on a conventional display screen. The present invention includes an optical assembly which comprising optical prisms, spherical and cylindrical lenses, other symmetrical lenses, special optical elements ("optical elements"). The functionality of the invented optical assembly is to introduce parallax by means of optical refraction wherein: (a) when a 2D scene shown on a conventional display screen is viewed through the optical assembly, the assembly induces the left eye to perceive a left eye offset image and the right eye to perceive a right eye offset image which appear to be located at a different spatial location than actual physical location of the 2D scene shown on the display screen; (b) a small spatial difference exists between perceived location of the left eye offset image by the left eye retina and perceived location of the right eye offset image by the right eye retina; (c) the left eye offset image and the right eye offset image created by the assembly fall within at least one of the following viewing modes: positive parallax hyperstereo viewing mode; positive parallax hypostereo viewing mode; negative parallax hyperstereo viewing mode and negative parallax hypostereo viewing mode, which cause the viewer to perceive the 2D scene shown on a conventional display screen as 3D stereoscopic vision. The fundamental principle of the present invention is to introduce parallax by means of optical refraction.

The present invention utilizes spatial parallax to induce viewer with 3D stereoscopic vision when viewing a 2D content on a conventional display screen. The present invented optical stereoscopic display screen utilizes the optical assembly to provide spatial parallax. The 2D content can be any conventional image and is not required to undergo conventional 3D stereoscopic content processing. When viewing a 2D content on a conventional display screen, the optical assembly will separate the viewer's binocular focus and convergence by moving the convergence away from the display screen in order to eliminate the negative effect to 3D stereoscopic perception by zero parallax, technical means is to separate the screen plane and its image plane thus to achieve moving the binocular convergence away from the focus, the viewer's eyes thereby focus on the actual screen but converge onto the image screen. The two offset images on his left-eye retina and right-eye retina are duly generated due to the parallax. His brain further combines and processes the two offset images into one image to induce the sense of 3D stereoscopic perception.

The present invented optical 3D stereoscopic display screen has broadly achieved: (a) perceiving 3D vision when viewing 2D content on a conventional display screen; (b) no refractive degree; (c) no apparent dispersion; (d) enhancement to brightness, color vividness, and clarity; (e) no loss to resolution; (f) continuous extended spatial depth; (g) consecutive images; (h) no distortion or ghost effect. With regards to commercial application, the optical element should be selected from solid optical materials that are light with high transparency and with high refractive index.

DESCRIPTION OF THE DRAWING

The features and inventive aspects of the present invention will become more apparent upon reading the following exemplary embodiments, detailed description, claims, and drawings, of which is briefly described by the following:

FIG. 6(a) illustrates a plano-concave lens being replaced by a concentric annulus plano-concave lens with same curvature, or a plano-concave cylindrical lens being replaced by a concentric annulus plano-concave cylindrical lens with same curvature;

FIG. 6(b) illustrates a plano-convex lens being replaced by a concentric annulus plano-convex lens, known as Fresnel lens, with same curvature, or a plano-convex cylindrical lens being replaced by a concentric annulus plano-convex cylindrical lens, known as Fresnel cylindrical lens, with same curvature;

FIG. 10(a) illustrates the image with right shifted horizontal displacement and backward shifted vertical displacement when viewing an object through the rectangular prism that is counter-clockwise angled to the horizontal axis;

FIG. 10(b) illustrates the image with left shifted horizontal displacement and backward shifted vertical displacement when viewing an object through the rectangular prism that is clockwise angled to the horizontal axis;

FIG. 29 illustrates present invented optical stereoscopic display assembly in a large scale, which is structured by number of small optical stereoscopic display assemblies repeated as array in two-dimensional direction.

DETAILED DESCRIPTION OF THE INVENTION

Figure 1:
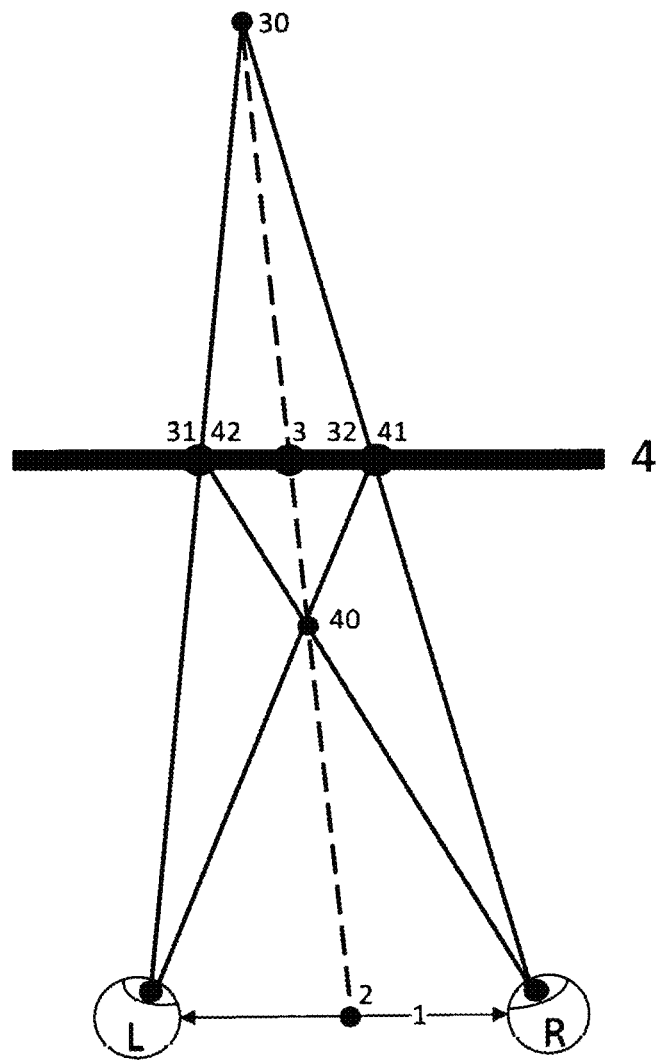
FIG. 1 illustrates the imaging principle of 3D stereoscopic vision on a conventional display screen when viewed by naked eyes L and R.
Figure 2:
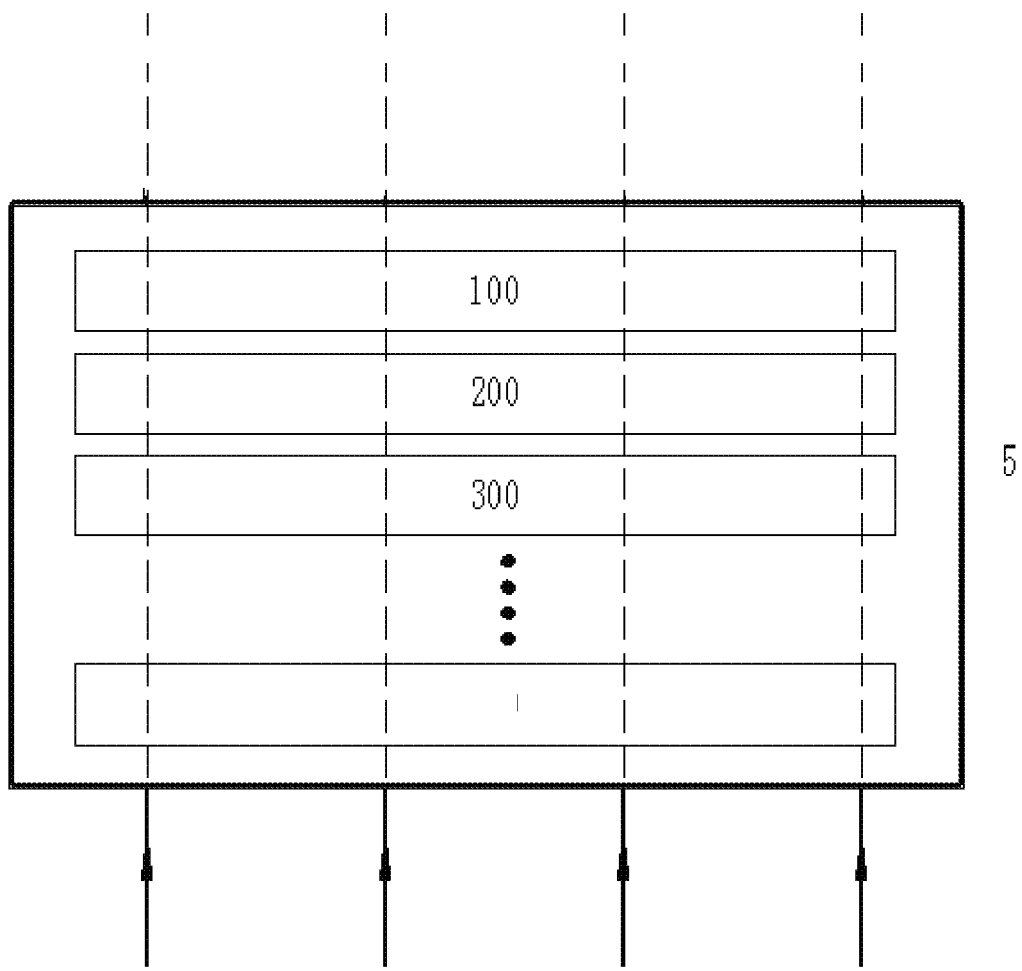
FIG. 2 illustrates the optical assembly of the present invented optical stereoscopic display screen composing of numbers of optical elements.

FIG. 2 is the schematic diagram of an optical assembly of present invented optical stereoscopic display assembly 5. Each optical element in the assembly is shown separately as 100, 200, 300 . . . and so on. The number of optical elements in the assembly may range from 1 up to 100 based on desired commercial applications and requirements.

Figure 3:
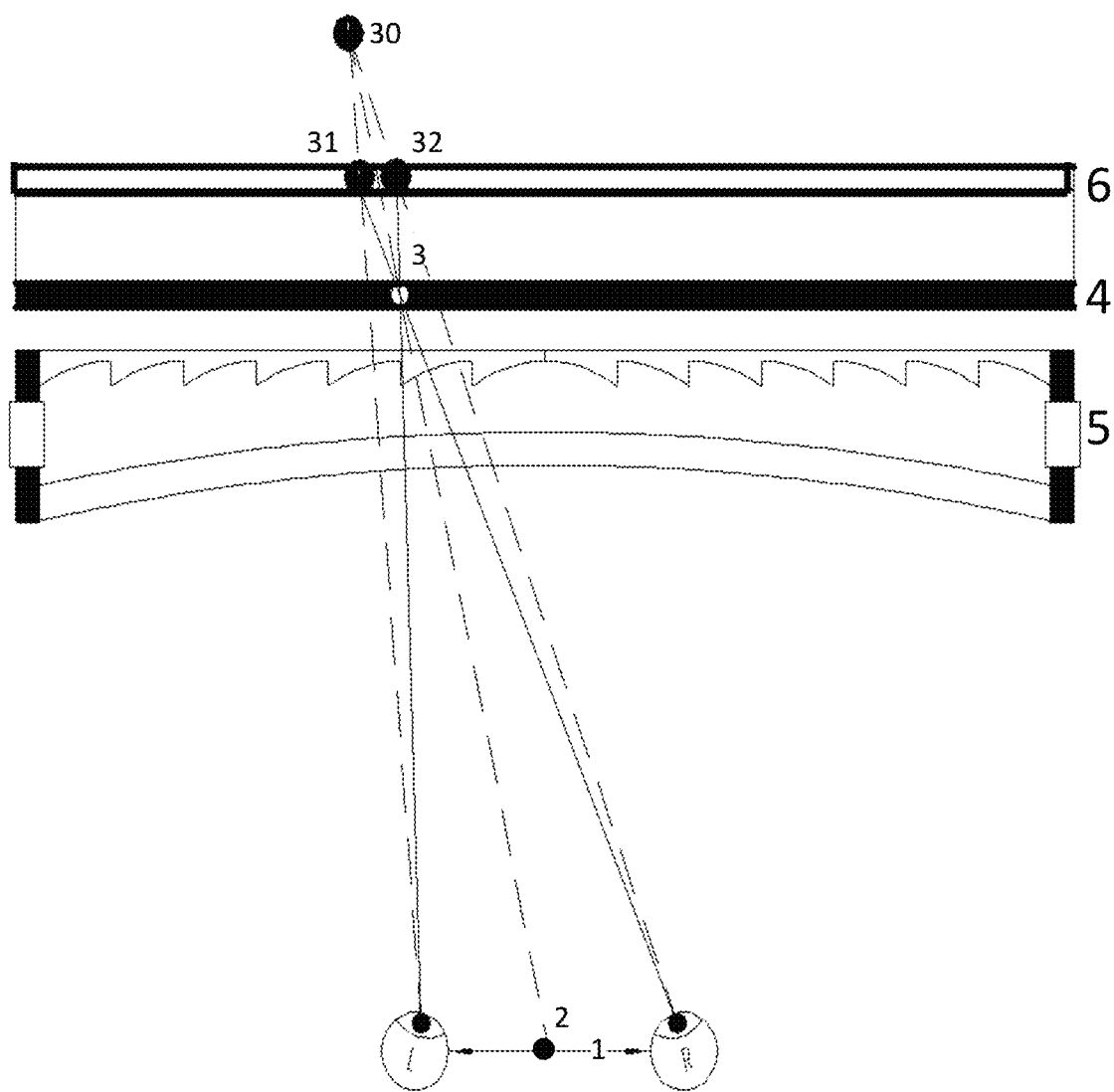
FIG. 3 illustrates a top cross-sectional view of one embodiment of present invented optical stereoscopic display assembly and the effect of 3D stereoscopic perception when naked eyes L and R viewed onto a conventional display screen.

FIG. 3 is a top cross-sectional view of one embodiment of present invented optical stereoscopic display assembly 5, which illustrates the imaging principle of 3D stereoscopic vision when naked eyes L and R viewing a captured scene spot 3 on a conventional display screen 4. Assuming the interocular distance is 1, the display screen 4 is in parallel with the eyes, by referring to FIG. 19, when viewing the object 3 on display screen 4, due to refraction by optical elements 100 and 200, the image screen 6 is shifted backward from the display screen 4, the left-eye offset image and the right-eye offset image on screen plane 6 are located at corresponding locations 31 and 32. For stereoscopic viewing, the binocular accommodation makes the eyes focus onto the screen 4, as brain is used to vergence effect, it automatically combines the left-eye offset image 31 and the right-eye offset image 32 to the spatial image 30. Thus, the viewer's eyes are convergence onto the object 30 in the viewing space and result in 3D stereoscopic perception. The image screen 6 falls behind the screen 4, it represents the image 3 plunge-in the screen 4, which represents the positive parallax viewing mode.

Figure 4A:
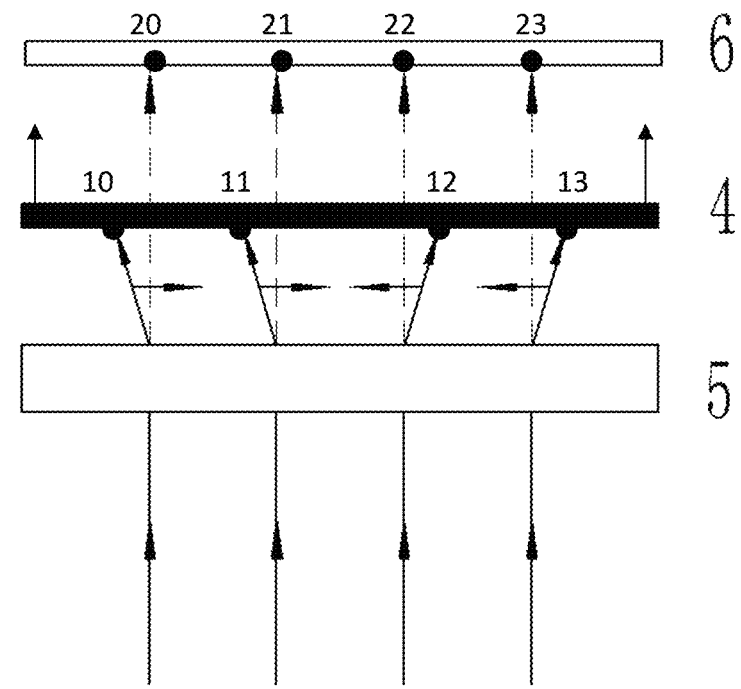
FIG. 4(a) illustrates a positive parallax hyperstereo viewing mode.
Figure 4B:
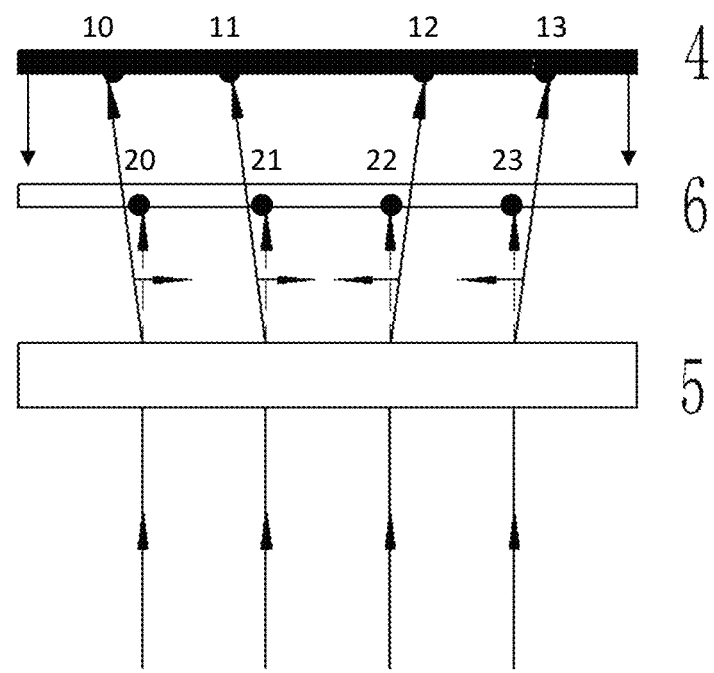
FIG. 4(b) illustrates a negative parallax hyperstereo viewing mode.
Figure 4C:
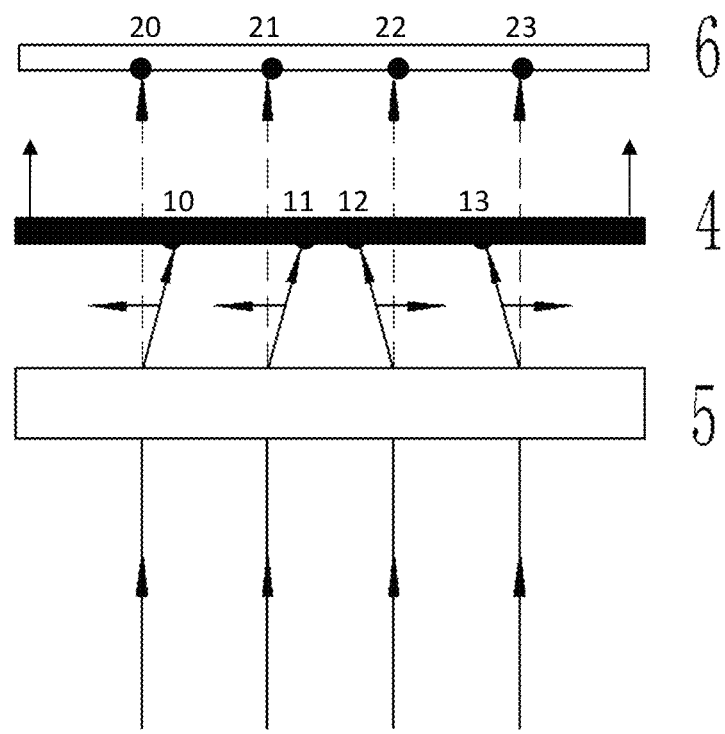
FIG. 4(c) illustrates a positive parallax hypostereo viewing mode.
Figure 4D:
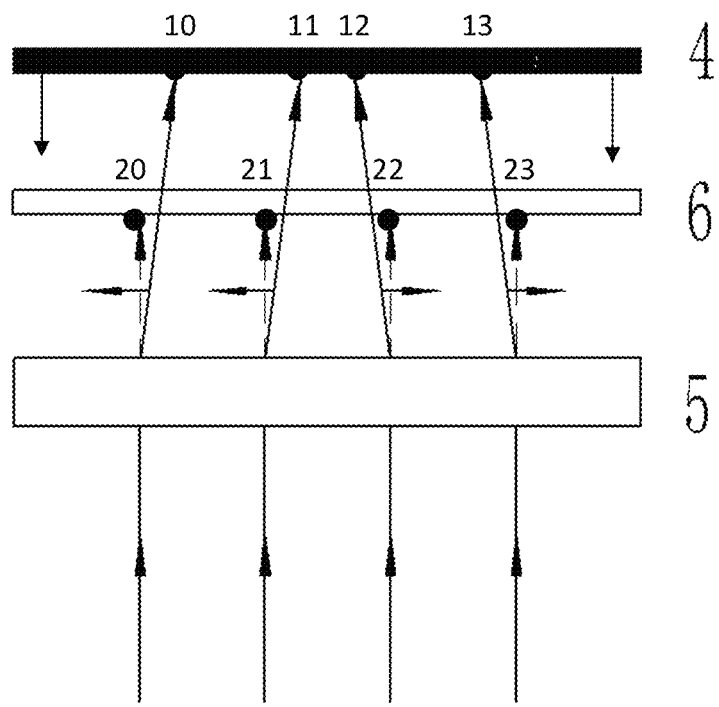
FIG. 4(d) illustrates a negative parallax hypostereo viewing mode.

FIGS. 4(a)-4(d) illustrate four stereoscopic viewing modes of the present invented optical stereoscopic display screen. When viewing a 2D content on a conventional display screen 4 through the present invented optical stereoscopic display assembly 5, the objective points 10 and 11 on the left side of the display screen 4 and the objective points 12 and 13 on the right side of the display screen 4 fall into the imaging points 20 and 21 on the left side of the image screen 6 and the imaging points 22 and 23 on the right side of the image screen 6. This results in spatial displacement which separates the binocular focus and convergence by moving the binocular convergence away from the display screen 4 along the advancing viewing direction. Due to the intercular distance of the eyes, the images on left eye retina and right eye retina exhibit minute differences, which meet the requirement for the brain to combine and melt the two parallax images on left-eye retina and right-eye retina, and induce the brain to restore spatial depth thus to perceive stereoscopic vision. Moreover, according to the characteristics of 3D imaging, FIG. 4(a) represents the positive parallax hyperstereo viewing mode of which the image screen 6 is located in the back of (or backward from) the display screen 4 by reduced image size; FIG. 4(b) represents the negative parallax hyperstereo viewing mode of which the image screen 6 is located in the front of (or forward from) the display screen 4 by reduced image size; FIG. 4(c) represents the positive parallax hypostereo viewing mode of which the image screen 6 is located in the back of (or backward from) the display screen 4 by enlarged image size; FIG. 4(d) represents the negative parallax hypostereo viewing mode of which the image screen 6 is located in the front of (or forward from) the display screen 4 by enlarged image size.

FIG. 4(a) illustrates the positive parallax hyperstereo viewing mode of the present invention which involving both horizontal and vertical parallax. In this mode, the image screen 6 is located in the back of (or backward from) the display screen 4. Moreover, by referring to the center of the screen 4, when viewing the objective points 10 and 11 on left side of the screen 4 through the present invented optical stereoscopic display assembly 5, it will be horizontally displaced to the right as shown by the image points 20 and 21 on the image screen 6. When viewing the objective points 12 and 13 on right side of the screen 4 through the present invented optical stereoscopic display assembly 5, it will be horizontally displaced to the left as shown by the image points 22 and 23 on the image screen 6. It results in the positive parallax hyperstereo viewing mode with vertical displacement shifted backward and forms reduced images.

Unless otherwise stated, the vertical direction hereinafter means the eyes' advancing direction.

FIG. 4(b) illustrates the negative parallax hyperstereo viewing mode of the present invention involving both horizontal and vertical parallax. In this mode, the image screen 6 is located in the front of (or forward from) display screen 4. Moreover, by referring to the center of screen 4, when viewing the objective points 10 and 11 on the left side of screen 4 through the present invented optical stereoscopic display assembly 5, it will be horizontally displaced to the right as shown by the objective points 20 and 21 on image screen 6. When viewing the image points 12 and 13 on the right side of screen 4 through the present invented optical stereoscopic display assembly 5, it will be horizontally displaced to the left as shown by image points 22 and 23 on image screen 6. It results in the negative parallax hyperstereo viewing mode with vertical displacement shifted forward and forms reduced images.

FIG. 4(c) illustrates a positive parallax hypostereo viewing mode of the present invention involving both horizontal and vertical parallax. In this mode, the image screen 6 is located in the back of (or backward from) display screen 4. Moreover, by referring to the center of screen 4, when viewing the objective points 10 and 11 on the left side of screen 4 through the present invented optical stereoscopic display assembly 5, it will be horizontally displaced to the left as shown by the image points 20 and 21 on image screen 6. When viewing the objective points 12 and 13 on the right side of screen 4 through the present invented optical stereoscopic display assembly 5, it will be horizontally displaced to the right as shown by the image points 22 and 23 on image screen 6. It results in the positive parallax hypostereo viewing mode with backward shifted vertical displacement and forms enlarged images.

FIG. 4(d) illustrates a negative parallax hypostereo viewing mode of the present invention involving both horizontal and vertical parallax. In this mode, the image screen 6 is located in front of (or forward from) the display screen 4. Moreover, by referring to the center of screen 4, when viewing the objective points 10 and 11 on the left side of screen 4 through the present invented optical stereoscopic display assembly 5, it will be horizontally displaced to the left as shown by the image points 20, 21 on image screen 6; when viewing the objective points 12 and 13 on the right side of screen 4 through the present invented optical stereoscopic display assembly 5, it will be horizontally displaced to the right as shown by the image points 22 and 23 on image screen 6. It results in the negative parallax hypostereo viewing mode with forward shifted vertical displacement and forms enlarged images.

Figure 5:
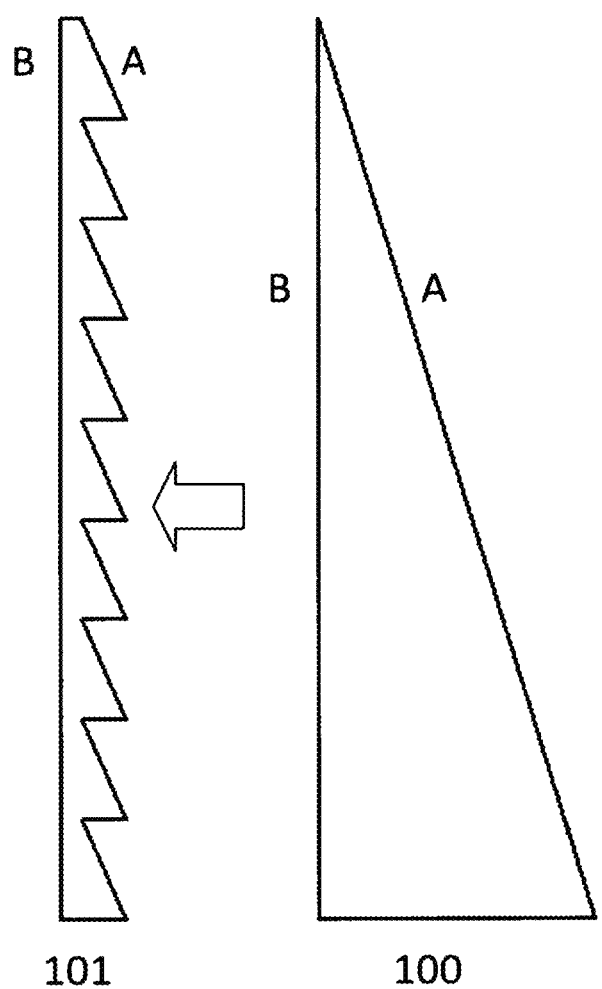
FIG. 5 illustrates a triangular prism being replaced by a continuous repetition triangular prism, known as Fresnel prism, with same vertex.

FIG. 5 illustrates the optical triangular prism 100 being replaced by the continuous repetition triangular prism 101, known as Fresnel prism, with same vertex. By refraction fundamentals, as long as triangular prisms retain the same vertex, the refracted emit lights remain the same direction while the incident parallel lights passing through the two main optical planes.

FIG. 6(a) illustrates the plano-concave lens 100 being replaced by the concentric annulus plano-concave lens 101. By refraction fundamentals, as long as the curvature retains the same for corresponding surface location, the refracted emit lights remain the same. It also illustrates the plano-concave cylindrical lens 100 being replaced by concentric annulus plano-concave cylindrical lens 101, and causes the similar effect as above discussed.

FIG. 6(b) illustrates the optical plano-convex lens 100 being replaced by the concentric annulus plano-convex lens 101, known as Fresnel lens. By refraction fundamentals, as long as the curvature retains the same at corresponding surface location, the refracted emit lights remain the same. It also illustrates the plano-convex cylinder lens 100 being replaced by the concentric annular plano-convex cylinder lens 101, known as Fresnel cylindrical lens, and causes the similar effect as above discussed.

Figures 6C, 6D:
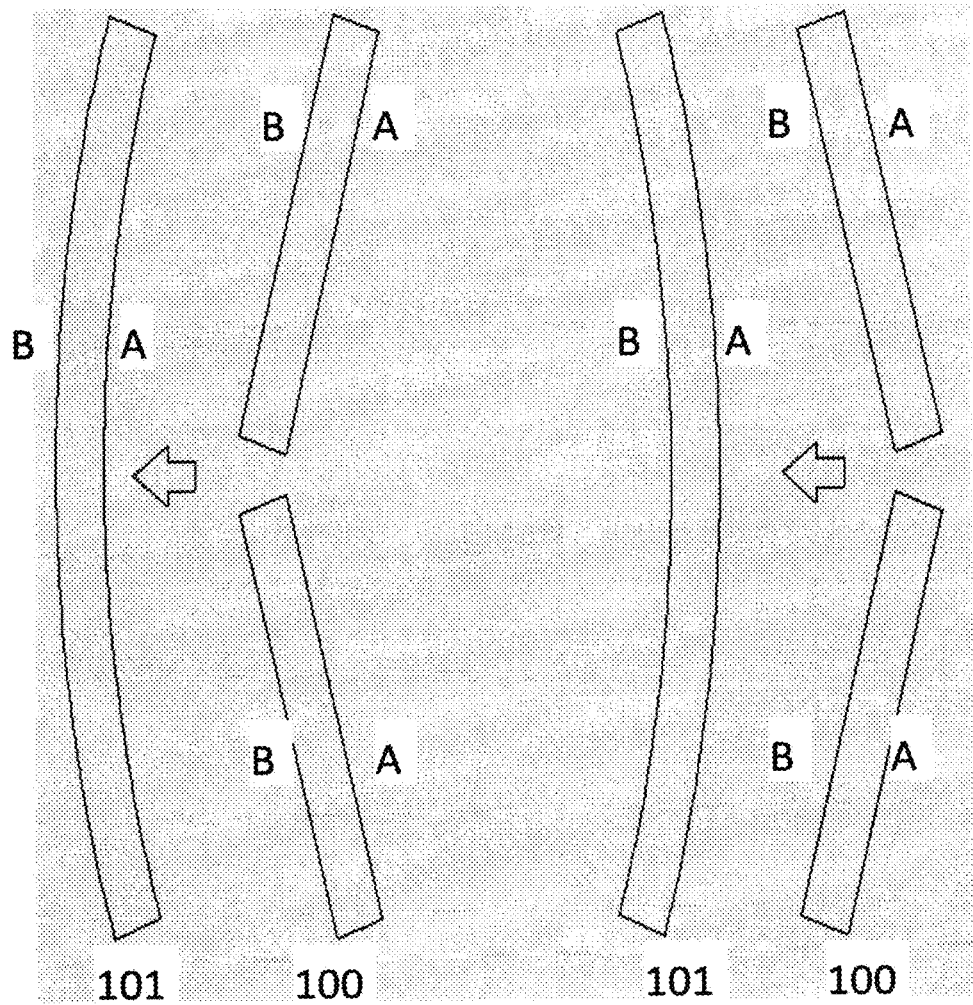
FIG. 6(c) illustrates a pair of rectangular prisms that are angled at predetermined degree to the vertical axis being replaced by a cylindrical concave lens while the angle and curvature are correlated under certain rules.
FIG. 6(d) illustrates a pair of rectangular prisms that are angled at predetermined degree to the vertical axis being replaced by a cylindrical convex lens while the angle and curvature are correlated under certain rules.

FIG. 6(c) illustrates a pair of rectangular prisms 101, which is angled at predetermined degree to the vertical axis, being replaced by the cylindrical concave lens 100. Assuming the optical element 100 is a combination of infinite and continuous pairs of small rectangular prisms, while vertex and curvature at corresponding surface location are correlated under certain rules, such as the difference of vertex and angle of curvature are approximately equal and relatively small, the length is relatively longer . . . and so on, the direction of the refracted emit lights remain the same direction while the incident parallel lights passing through the optical plane A and B.

FIG. 6(d) illustrates the pair of rectangular prisms 101, which is angled at predetermined degree to the vertical axis, being replaced by the cylindrical convex lens 100. Assuming the optical element 100 is a combination of infinite and continuous pairs of small rectangular prisms, while vertex and curvature at corresponding surface location are correlated under certain rules, such as the difference of vertex and angle of curvature are approximately equal and relatively small, the length is relatively longer . . . and so on, the refracted of the refracted emit lights remain the same direction while the incident parallel lights passing through the optical plane A and B.

Figure 7A:
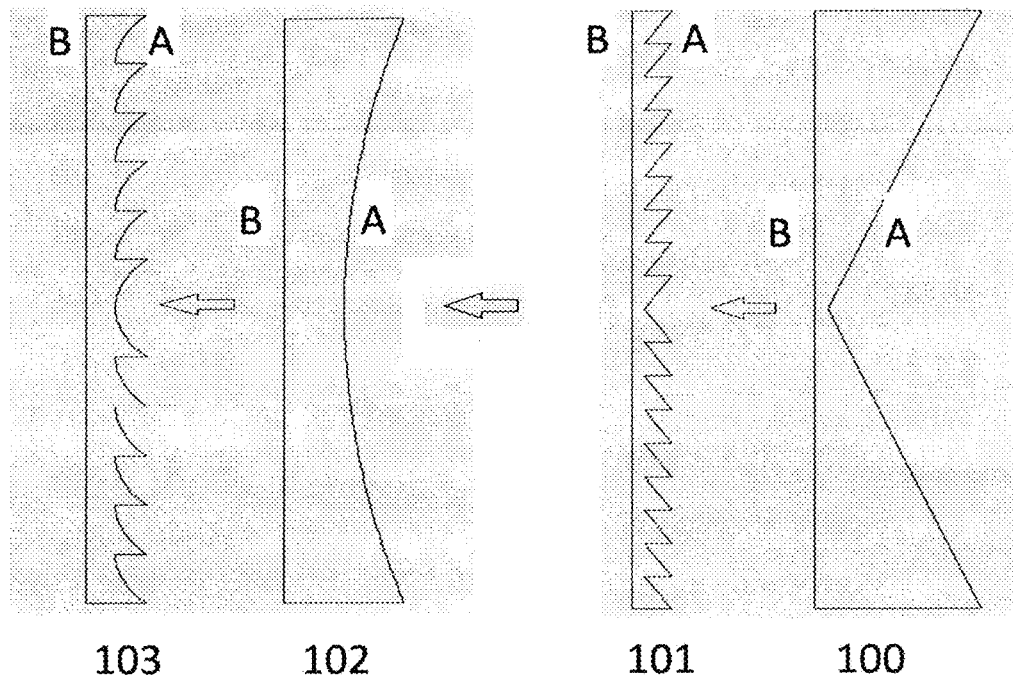
FIG. 7(a) illustrates a central-vertex symmetrical triangular prism being replace by a central-vertex Fresnel prism with same vertex, in turns, being replaced by a plano-concave cylindrical lens while the vertex and curvature are correlated under certain rules, moreover, being replace by a concentric annular plano-concave cylindrical lens with same curvature.

FIG. 7(a) illustrates the central-bass symmetrical triangular prism 100 being replaced by the central-bass Fresnel prism 101, in turns, being replaced by the cylindrical lens 102, moreover, being replaced by the concentric annular plano-concave cylindrical lens 103. By refraction fundamentals, for a corresponding surface location, as long as the curvatures retain the same and the vertex retain the same, as well as the curvature and vertex are correlated under certain rules, such as the difference of vertex and angle of curvature are approximately equal and relatively small, the length is relatively larger . . . and so on, the refracted emit lights remain the same direction while the incident parallel lights passing through the optical plane A and B.

Figure 7B:
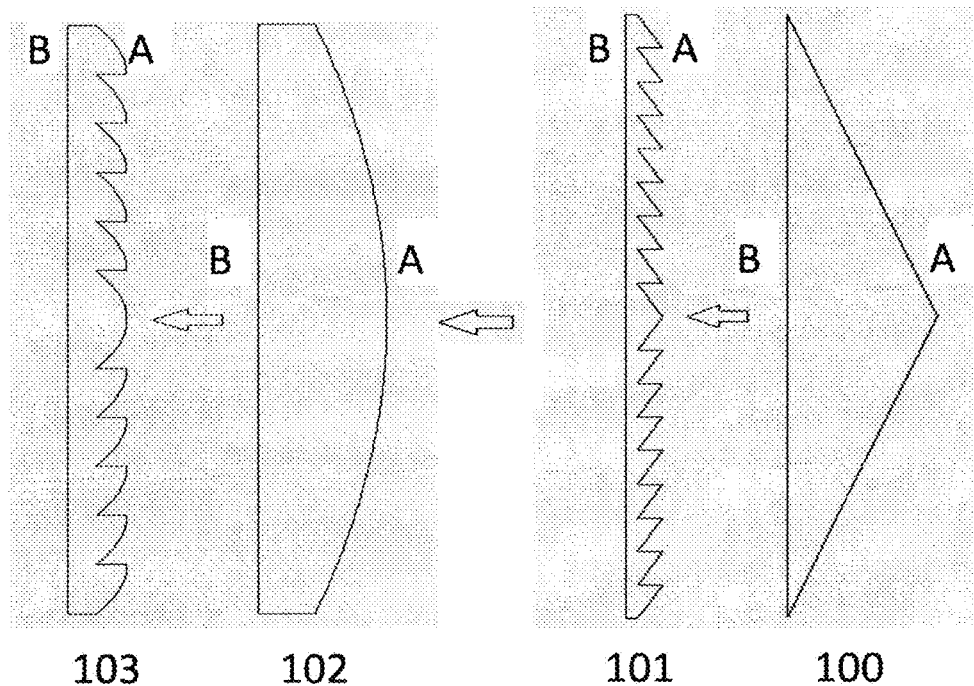
FIG. 7(b) illustrates a central-base symmetrical triangular prism being replace by a central-base Fresnel prism with same vertex, in turns, being replaced by a plano-convex cylindrical lens while the vertex and curvature are correlated under certain rules, moreover, being replace by a Fresnel lens with same curvature.

FIG. 7(b) illustrates the central-vertex symmetrical triangular prism 100 being replaced by the central-vertex Fresnel prism 101, in turns, being replaced by a cylindrical lens 102, moreover, being replaced by the concentric annular plano-convex cylindrical lens 103. By refraction fundamentals, for a corresponding surface location, as long as the curvatures retain the same and the vertex retain the same, as well as the curvature and vertex are correlated under certain rules, such as the difference of vertex and angle of curvature are approximately equal and relatively small, the length is relatively longer . . . and so on, the refracted emit lights remain the same direction while the incident parallel lights passing through the two optical plane A and B.

Binocular disparity and spatial parallax are the most important factor to perceive 3D stereoscopic vision. The present invention presents optical stereoscopic display screen which includes an optical assembly that can perceive 3D stereoscopic vision when viewing 2D content on a conventional display screen. When utilizing the optical assembly, it is able to induce viewer's brain to yield depth perception, restore the continuous extension of the nature space, generate 3D stereoscopic vision and view along with continuous depth field. The present invented optical stereoscopic display screen not only solves the technical issues of multi-layer depth of space but also negate the required preparation of 3D stereoscopic content for 3D stereoscopic viewing.

Commercialized stereoscopic display screen shall take in consideration of the considerable difference in everyone's ability to adapt parallax and adjust convergence in order to prevent excessive binocular convergence or divergence, meet a wide range of commercial application requirements for wide adaption; and maximize comfort, adjustability, and convenience. A properly designed optical stereoscopic display screen shall possess characteristics of positive parallax, convergent imaging, appropriate spatial depth and strong sense of 3D perception. Among FIGS. 4(a), 4(b), 4(c) and 4(d), FIG. 4(a) represents the positive parallax hyperstereo viewing mode with appropriate spatial depth and strong sense of stereoscopic vision, and meets fundamental requirements for optical 3D stereoscopic display, this is the preferred stereoscopic display screen of choice; FIG. 4(b) represents the negative parallax hyperstereo viewing mode, improperly limit the close-ranged objects may cause extreme visual convergence, result in excessive inward squinting and causing visual fatigue and disease. Moreover, viewer's brain is not comfortable imaging a reduced but closer objects, especially, to the defocused or scattered images. Thus, it is not a suitable commercial product; FIG. 4(c) represents the positive parallax hypostereo viewing mode, improper limit the far-ranged objects may cause extreme visual divergence, result in excessive outward squint. Furthermore, this viewing mode has an appropriate sense of 3D vision but poor spatial depth. If it maintains control of refraction and minimizes the close-ranged scenes in production, it is the next preferred commercial stereoscopic display screen of choice; FIG. 6(d) represents the negative parallax hypostereo viewing mode, improper limit the close and far ranged objects may cause extreme visual convergence or divergence, result in excessive inward and outward squint and causing visual fatigue and visual disease. Moreover, viewer's brain is not comfortable imaging a enlarged but distant objects, especially, to the defocused or scattered images. Thus, it is not a suitable commercial product. The conclusion is that only positive parallax is adopted to perceive a proper 3D stereoscopic vision, besides, hyperstereo viewing mode is much preferable than hypostereo viewing mode.

The present invented optical stereoscopic display assembly 5 composes of optical elements. As shown in FIG. 2, each element represents an optical prism, spherical and cylindrical lens, other symmetrical lens, special optical element, or the like. When viewing a 2D content on a conventional display screen 4 through the optical stereoscopic display assembly 5, the image screen 6 posses spatial displacement due to refraction, causes separation of binocular focus and convergence by moving the binocular convergence away from the display screen 4 along the advancing viewing direction, thus, eliminates the negative effect to 3D stereoscopic sense by zero parallax, induces stereoscopic perception and achieves 3D stereoscopic viewing mode outlined in FIGS. 4(a)-4(d). For commercial applications, the thickness of the optical stereoscopic display assembly 5 should be as thin as possible which can be achieved by choosing the high refractive optical material. Thus, when designing the optical elements, the structure of Fresnel prism, as shown in FIG. 5, is much preferable than triangular prism; the concentric annular plano-concave lens and concentric annular plano-concave cylindrical lens, as shown in FIG. 6(a), are much preferable than plano-concave lens and plano-concave cylindrical lens; the concentric annular plano-convex lens and concentric annular plano-convex cylindrical lens, as shown in FIG. 6(B), are much preferable than plano-convex lens and plano-convex cylindrical lens. Furthermore, when viewing a 2D content on a conventional display screen through the present invented optical stereoscopic display assembly, besides to perception of stereoscopic vision, it attains vivid colors, brighter and sharper images than viewed directly by naked eyes. This is because the response of the naked eyes to background light and stray light is greater than filtered by optical elements. The invented optical stereoscopic display assembly is comprised of a plurality of optical elements which features functionality of separating and filtering background lights and stray lights.

Figure 8:
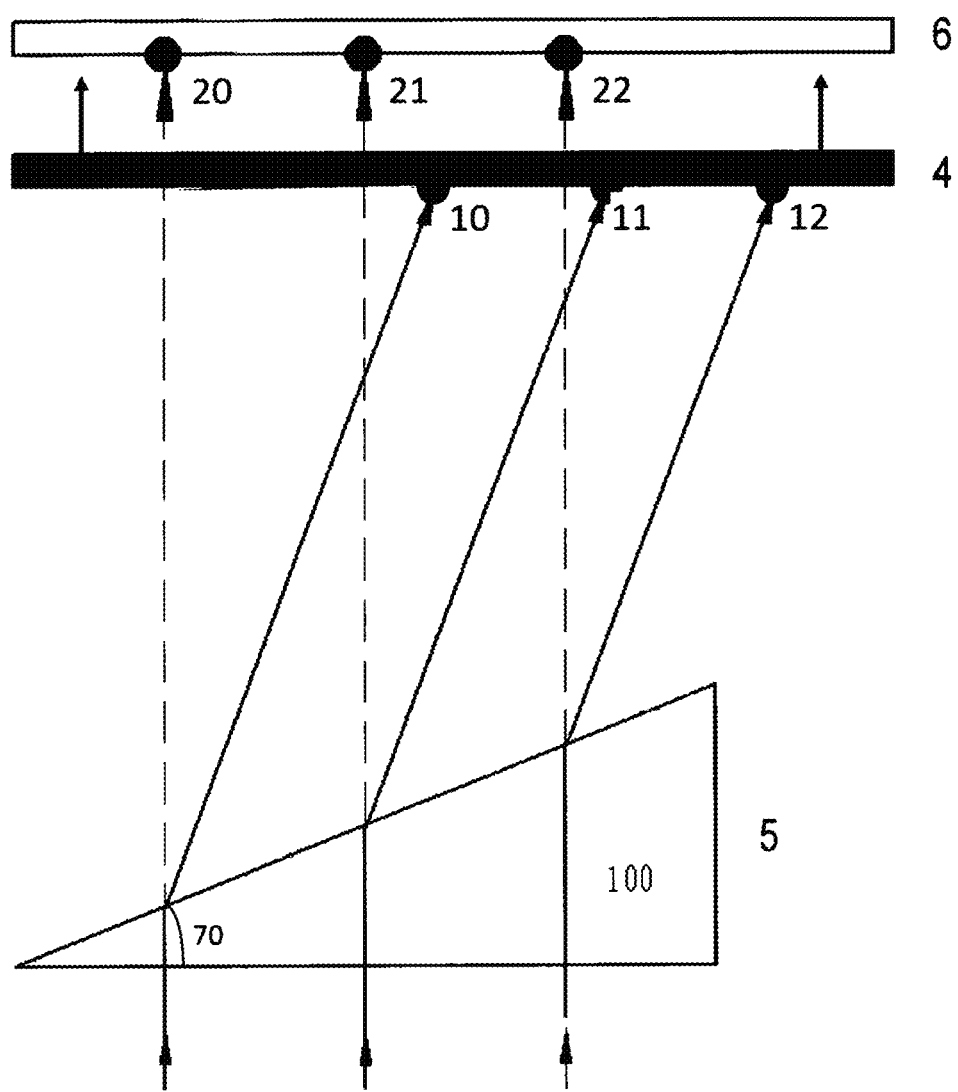
FIG. 8 illustrates a viewing mode when viewing a captured scene on a display screen through triangular prism.

Referring to FIG. 8, the optical element 100 is a triangular prism with vertex 70 placed along the horizontal axis. When viewing three objective points 10, 11 and 12 shown on the conventional display screen 4 through the optical element 100, due to refraction, the viewing pathways experience spatial deflection shown by respective image points 20, 21 and 22 on image screen 6. The horizontal displacement shifted to the left and vertical displacement shifted backward. The spatial displacement achieved by triangular prism 100 indicates that triangular prism can be used as optical element for the stereoscopic display assembly 5 to fulfill functionality requirements by the viewing modes shown in FIGS. 4(a)-4(d). Unless otherwise stated, a triangular prism is hereinafter defined as two main optical planes or extension across a vertex angle.

Figure 9:
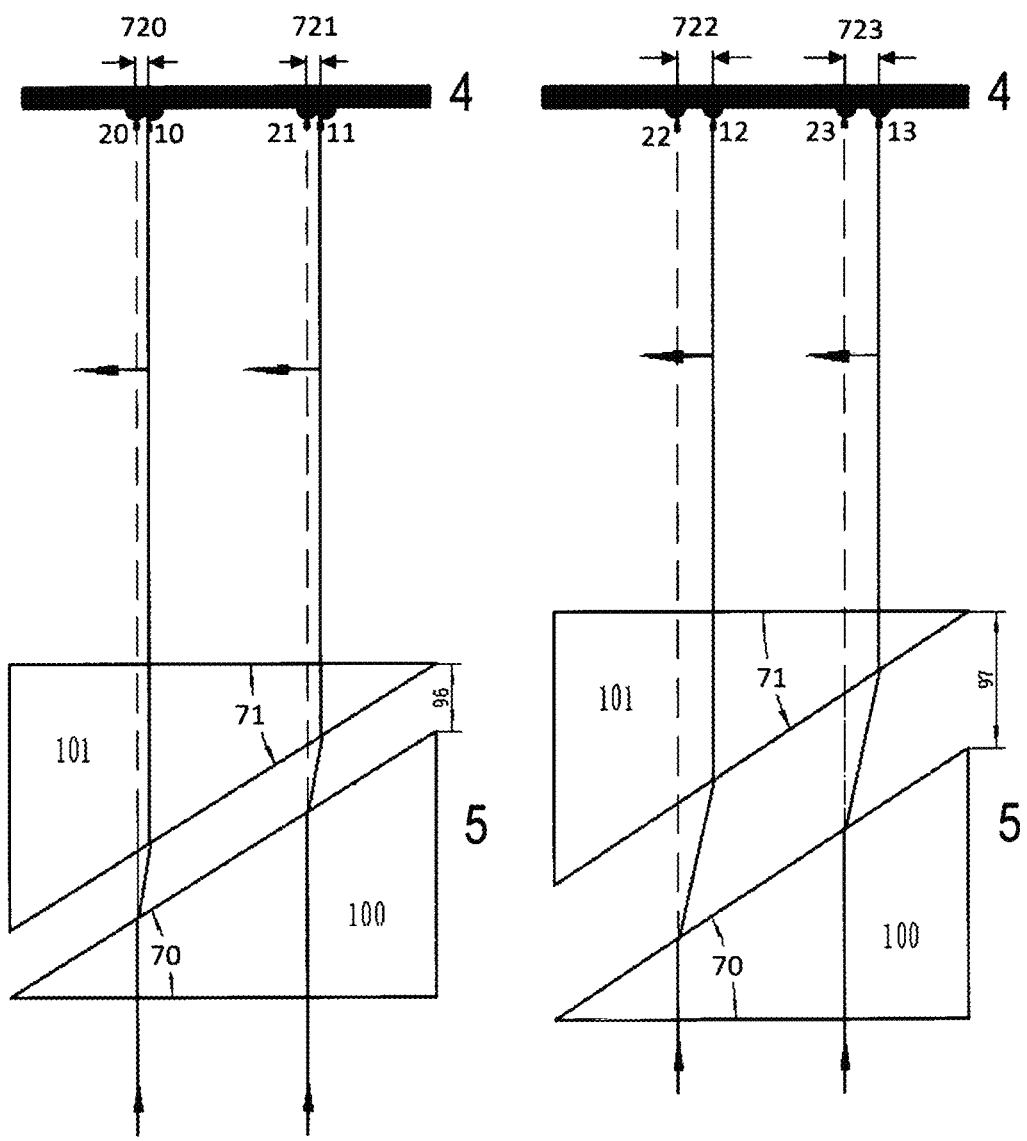
FIG. 9 illustrates difference of horizontal displacement based upon amount of separation space between two triangular prisms.

Referring to FIG. 9, a triangular prism 100 with vertex 70 and an opposing triangular prism 101 with vertex 71 are separated by the separation space 96 as shown on the left portion of FIG. 9, or a triangular prism 100 with vertex 70 and an opposing triangular prism 101 with vertex 71 are separated by the separation space 97 as shown on the right portion of FIG. 9. The only difference between the left portion and the right portion of FIG. 9 is that the size of separation space 97 is greater than the size of separation space 96. When viewing the objective points 10, 11 and 12, 13 through the optical elements 100 and 101, due to refraction, the viewing pathways experience spatial deflection shown by the corresponding image points 20, 21 and 22, 23. The spatial displacement includes the horizontal displacement (720, 721) and (722, 723) shifted to the left and zero vertical displacement. Comparing the left portion and the right portion of FIG. 9, it is concluded that the larger the separation space 97 vs. 96 the greater the horizontal displacement (720, 721) vs. (722, 723). Accordingly, the amount of horizontal displacement or horizontal parallax can be regulated by the size of the separation space.

Referring to FIGS. 10(a) and 10(b), the rectangular prism 100 angled at a predetermined degree either counter clockwise 60 or clockwise 61 to the horizontal axis. When viewing the objective points 10, 11 and 12 through the optical element 100, the viewing pathways deflected due to refraction by the optical element 100 which results in spatial displacements as shown by the corresponding imaging points 20, 21 and 22. The spatial displacements include the horizontal displacement 720 and the vertical displacement 820. The rectangular prism angled at a predetermined degree counter clockwise 60 is horizontally displaced to the right and vertically displaced backward. The rectangular prism angled at a predetermined degree clockwise 61 is horizontally displaced to the left and vertically displaced backward. The spatial displacements caused by the angled rectangular prism 100 indicate that it can function as the optical element to fulfill the functionality requirements by the viewing modes shown in FIGS. 4(a)-4(d). Unless otherwise stated, a rectangular prism hereinafter is defined by the two main optical planes parallel to each other.

Figure 11:
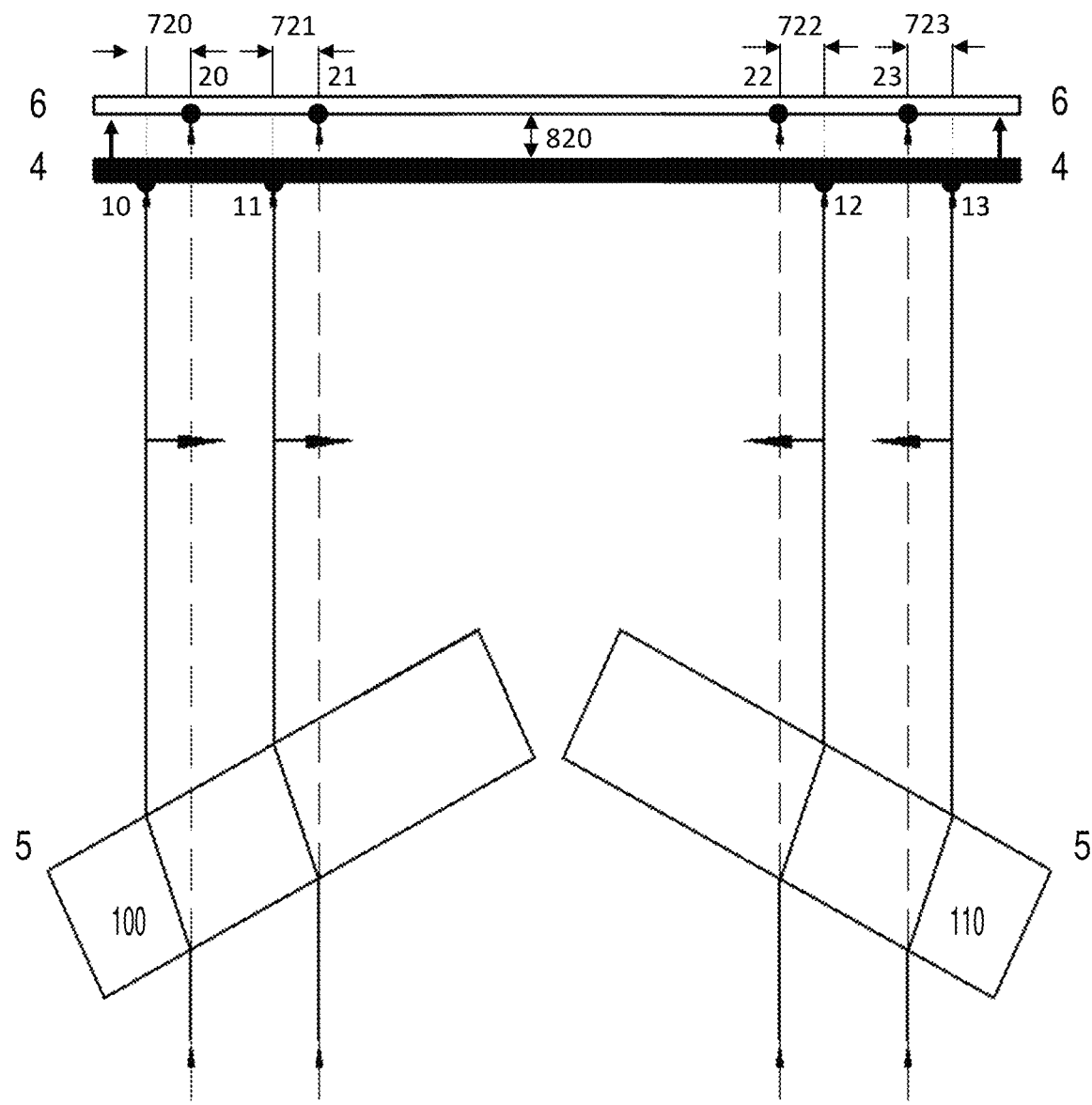
FIG. 11 illustrates a positive parallax hyperstereo viewing mode when viewing onto a conventional display screen through the pair of rectangular prisms.

Referring to FIG. 11, a pair of rectangular prisms 100 and 110 is angled at a predetermined degree one counterclockwise and another clockwise to the horizontal axis. Pursuant to fundamental optical theory, to view a 2D content on a conventional display screen 4, the following scenarios occur. When viewing a 2D content on display screen 4 without the optical elements exist, viewer will focus and convergence directly onto the display screen 4, the viewed objects and corresponding images remain the same on display screen 4, there is no spatial displacement, zero parallax, and non-stereoscopic perception. When viewing a 2D content on display screen 4 through the rectangular prisms, the objective points 10 and 11 on the left side of display screen 4 have been horizontally displaced (720, 721) to the right as shown by the imaging points 20 and 21 on image screen 6, the objective points 12 and 13 on the right side of display screen 4 have been horizontally displaced (722, 723) to the left as shown by the imaging points 22 and 23 on image screen 6, the structure of rectangular prisms produces reduced images. The image screen 6 is located in the back of (or backward from) display screen 4 resulting in backward vertical displacement 820. As a result of the vertical displacement, it separates binocular focus and convergence by moved the binocular convergence away from display screen 4 along the advancing viewing direction. Due to the intercular distance of the eyes, small differences between the two images on left and right retinas exist, which meets the requirements for brain to combine and melt spatial parallax and induces 3D stereoscopic perception.

Figure 12:
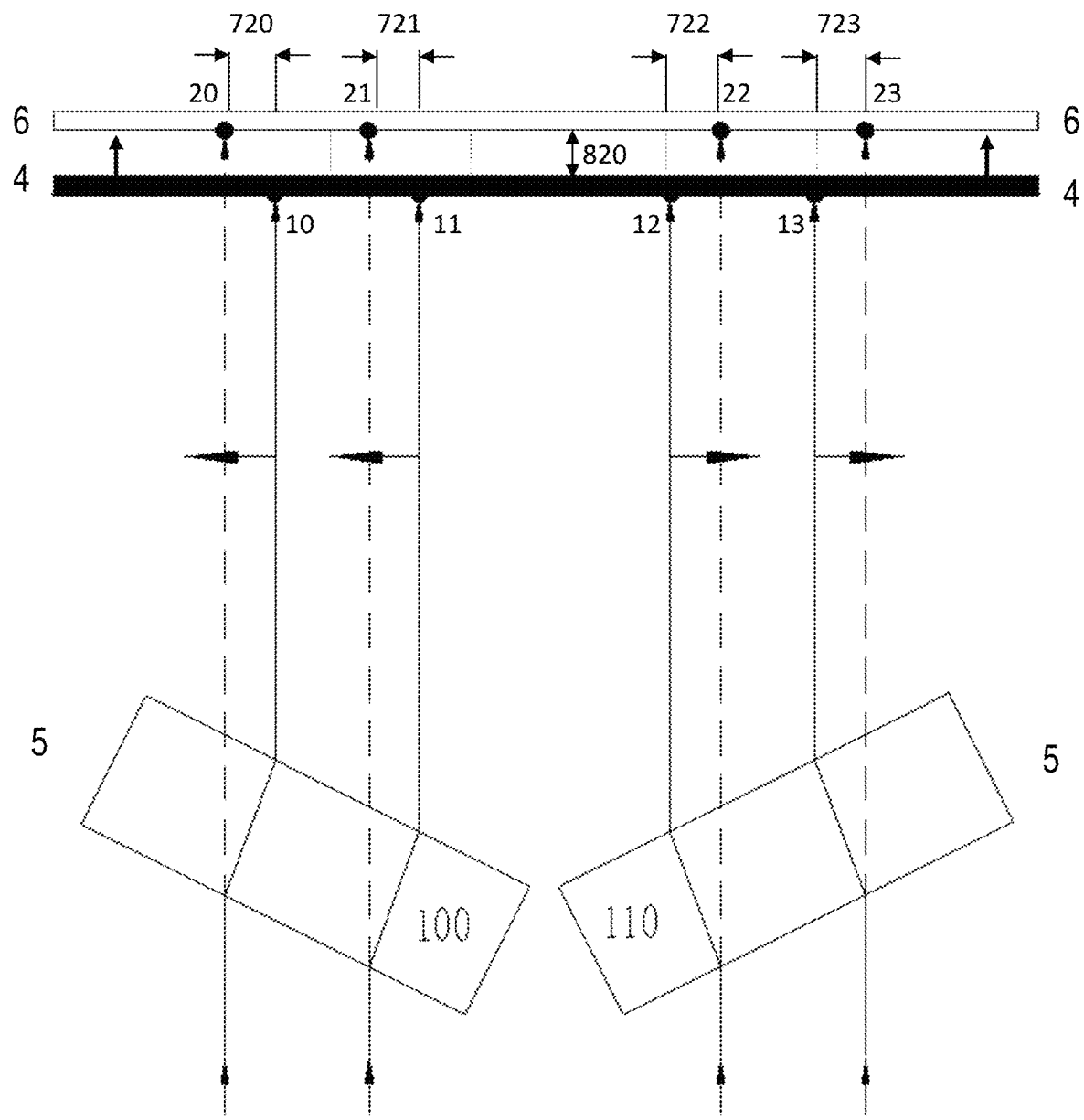
FIG. 12 illustrates a positive parallax hypostereo viewing mode when viewing onto a conventional display screen through another pair of rectangular prisms.

Referring to FIG. 12, a pair of rectangular prisms 100 and 110 is angled at a predetermined degree one counterclockwise and another clockwise to the horizontal axis. By comparison to FIG. 11, this structure of optical elements produces enlarged images as indicated by the horizontal displacement (720, 721) and (722, 723). The structure of rectangular prisms produces enlarged images. The image screen 6 is located in the back of (or backward from) display screen 4 resulting in backward vertical displacement 820. As a result of the vertical displacement, it separates binocular focus and convergence by moved the binocular convergence away from display screen 4 along the advancing viewing direction. Due to the intercular distance of the eyes, small differences between the two images on left and right retinas exist, which meets the requirement for brain to combine and melt spatial parallax and induces 3D stereoscopic perception.

Figure 13:
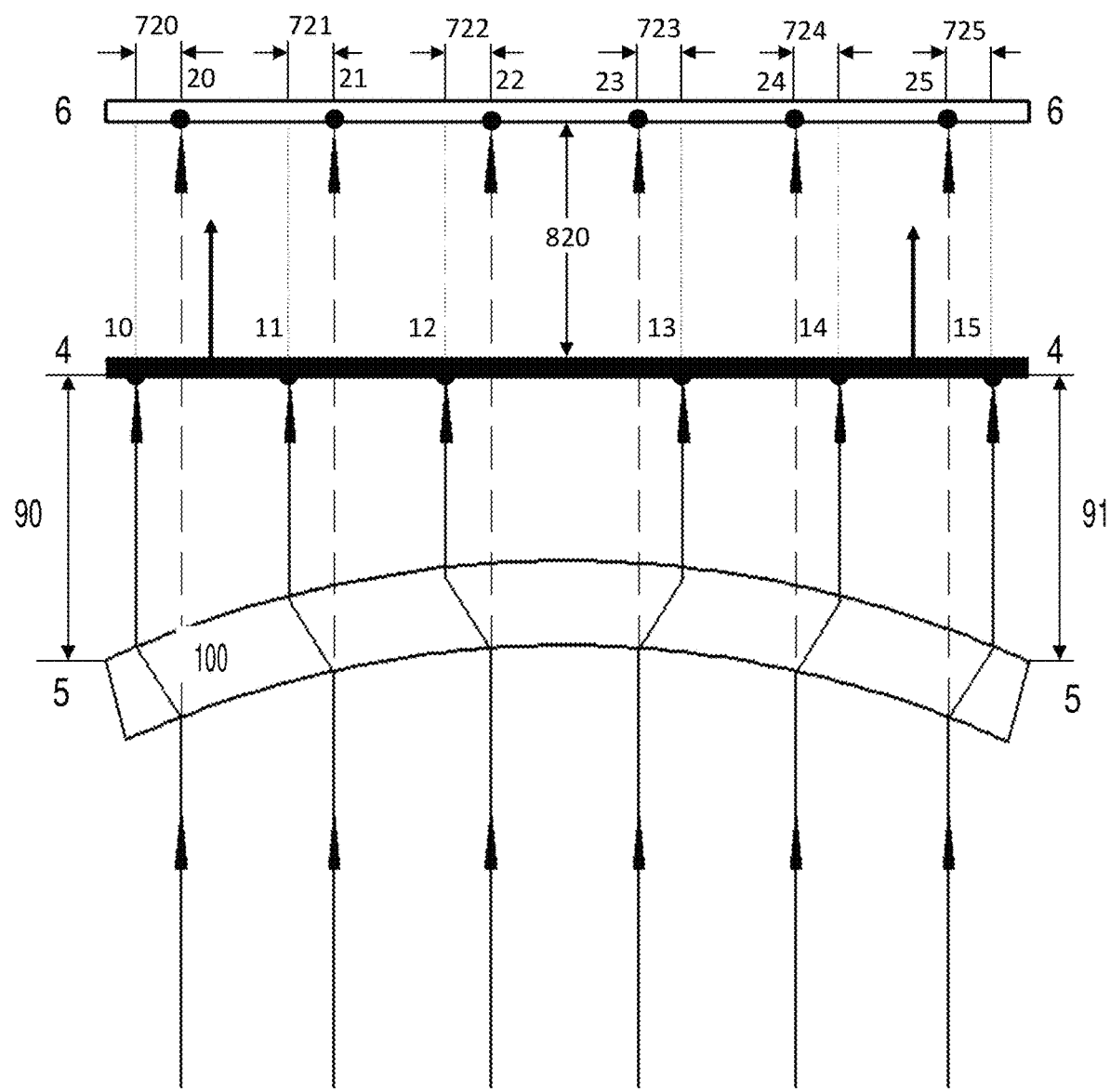
FIG. 13 illustrates a positive parallax hyperstereo viewing mode when viewing onto a conventional display screen through an embodiment of present invented optical stereoscopic display assembly, which includes a curved lens or cylindrical lens as the optical element of which the concave surface faces to viewer.

Referring to FIG. 13 and in this embodiment, the present invented optical stereoscopic display assembly 5 includes optical element of concave lens 100 or concave cylindrical lens 100, which can be regarded as evolved from the combination of infinite and continuous pairs of small rectangular prisms 100 and 110 as shown in FIG. 11. The separation spaces 90 and 91 between the optical stereoscopic display assembly 5 and display screen 4 are measured from the edge of the optical element to the display screen 4. Generally, the left separation space equals to the right separation space (90=91). When viewing a 2D content on display screen 4 through the present invented display assembly 5, the objective points 10, 11 and 12 on the left side of display screen 4 have been horizontally displaced (720, 721, 722) to the right as shown by the imaging points 20, 21 and 22 on image screen 6; the objective points 13, 14 and 15 on the right side of display screen 4 have been horizontally displaced (723, 724, 725) to the left as shown by the imaging points 22, 23 and 24 on image screen 6. Image screen 6 is located in the back of (or backward from) display screen 4 resulting in backward vertical displacement 820. As a result of the vertical displacement to image screen 6, it eliminates the negative effect to 3D stereoscopic perception by zero parallax, separates binocular focus and convergence by moving the binocular convergence away from display screen 4 along the advancing viewing direction, and represents reduced images which fall in the back of (or backward from) display screen 4.

Figure 14:
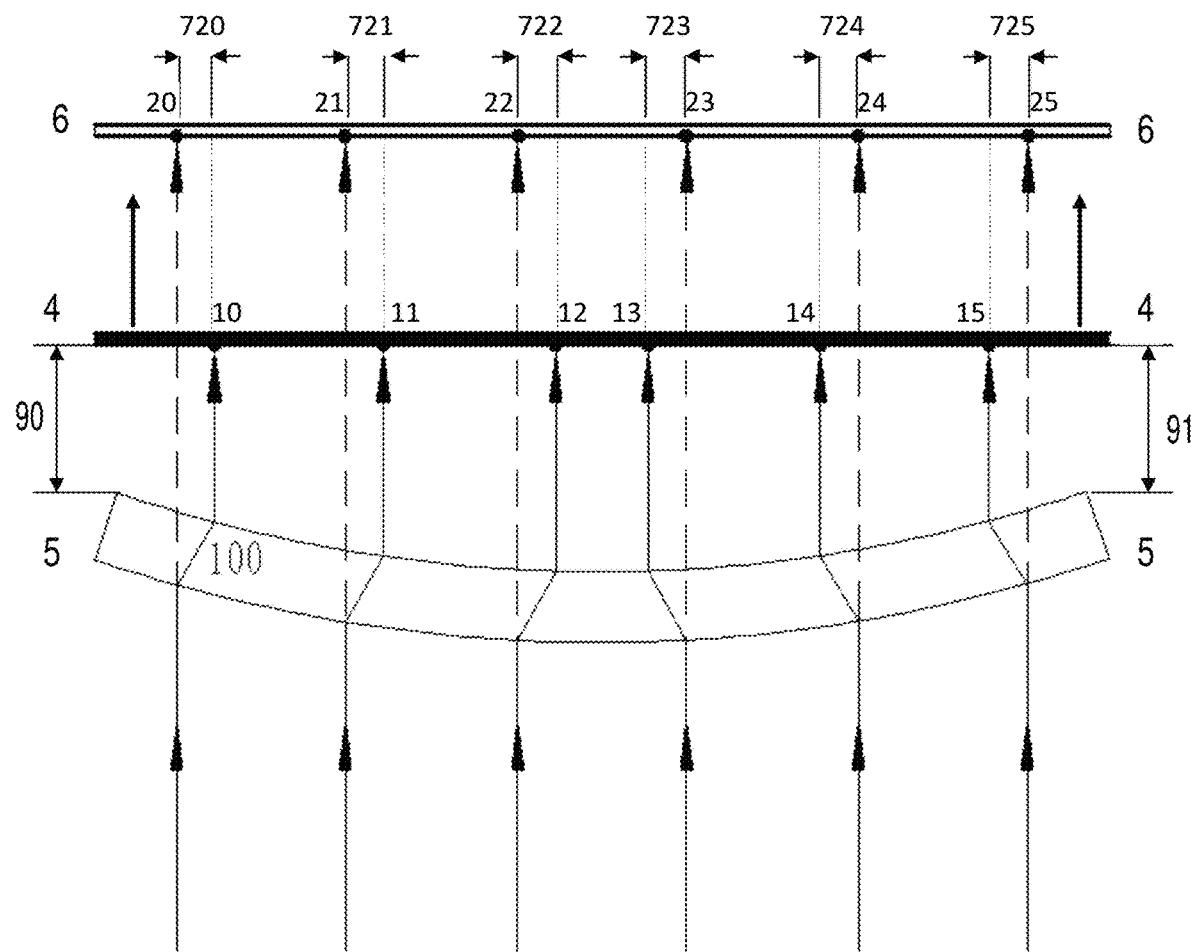
FIG. 14 illustrates a positive parallax hypostereo viewing mode when viewing onto a conventional display screen through an embodiment of present invented optical stereoscopic display assembly, which includes a curved lens or cylindrical lens as the optical element of which the convex surface faces to viewer.

Referring to FIG. 14 and in this embodiment, the present invented optical stereoscopic display assembly 5 includes the optical element of convex lens 100 or convex cylindrical lens 100. By comparison to FIG. 13, this structure of optical elements produces enlarged images as indicated by the horizontal displacements (720, 721, 722, vs. 723, 724, 725). Image screen 6 is located in front of (or forward from) screen 4 resulting in forward vertical displacement 820. As a result of the vertical displacement to image screen 6, it eliminates the negative effect to 3D stereoscopic perception by zero parallax, separates binocular focus and convergence by moving the binocular convergence away from display screen 4 along the advancing viewing direction, and represents enlarged images which fall in the back of (or backward from) display screen 4.

Figure 15:
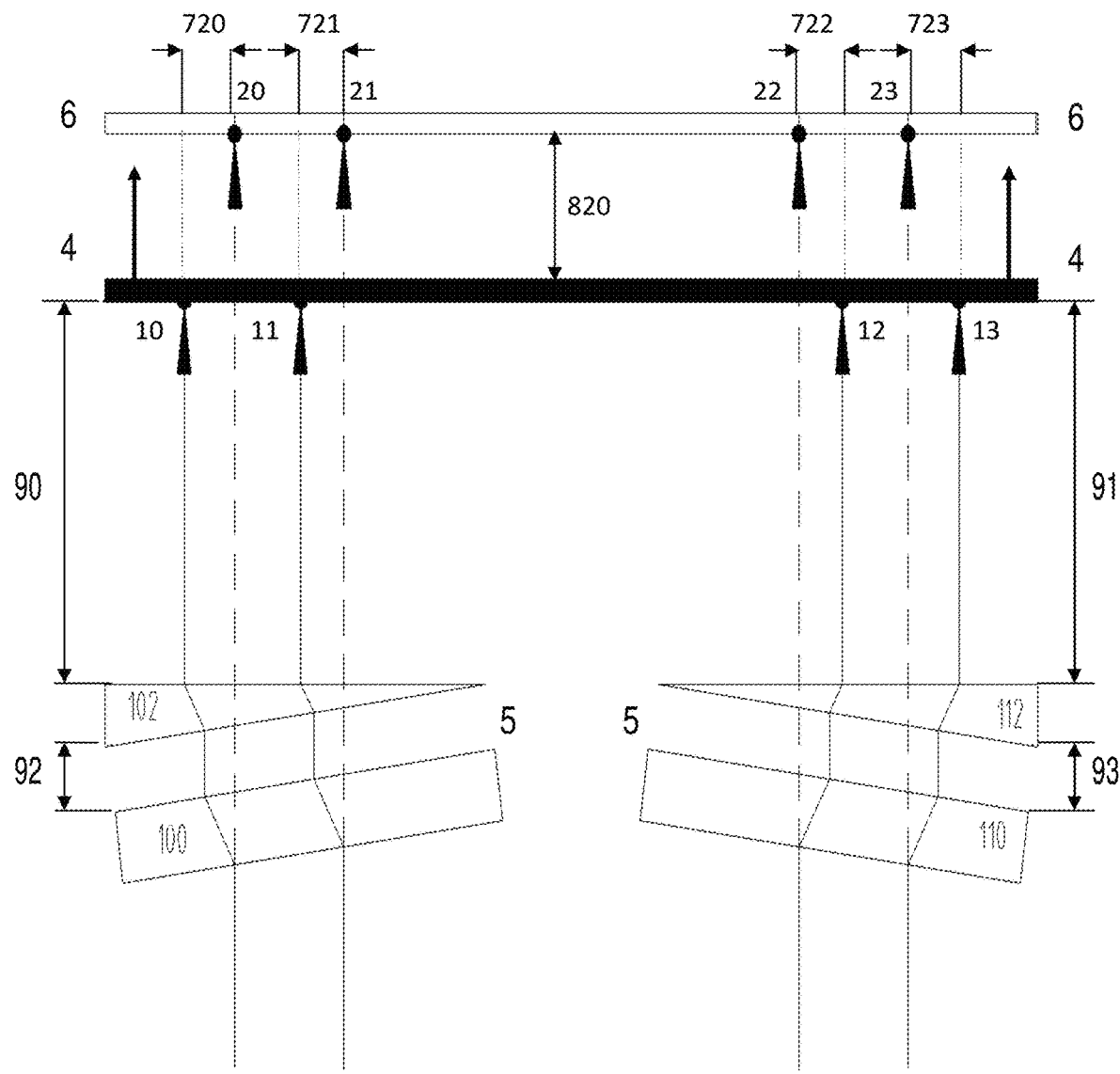
FIG. 15 illustrates a positive parallax hyperstereo viewing mode with enhanced effect when viewing onto a conventional display screen through an optical assembly which combines the structured prisms in FIGS. 8, 11.
Figure 16:
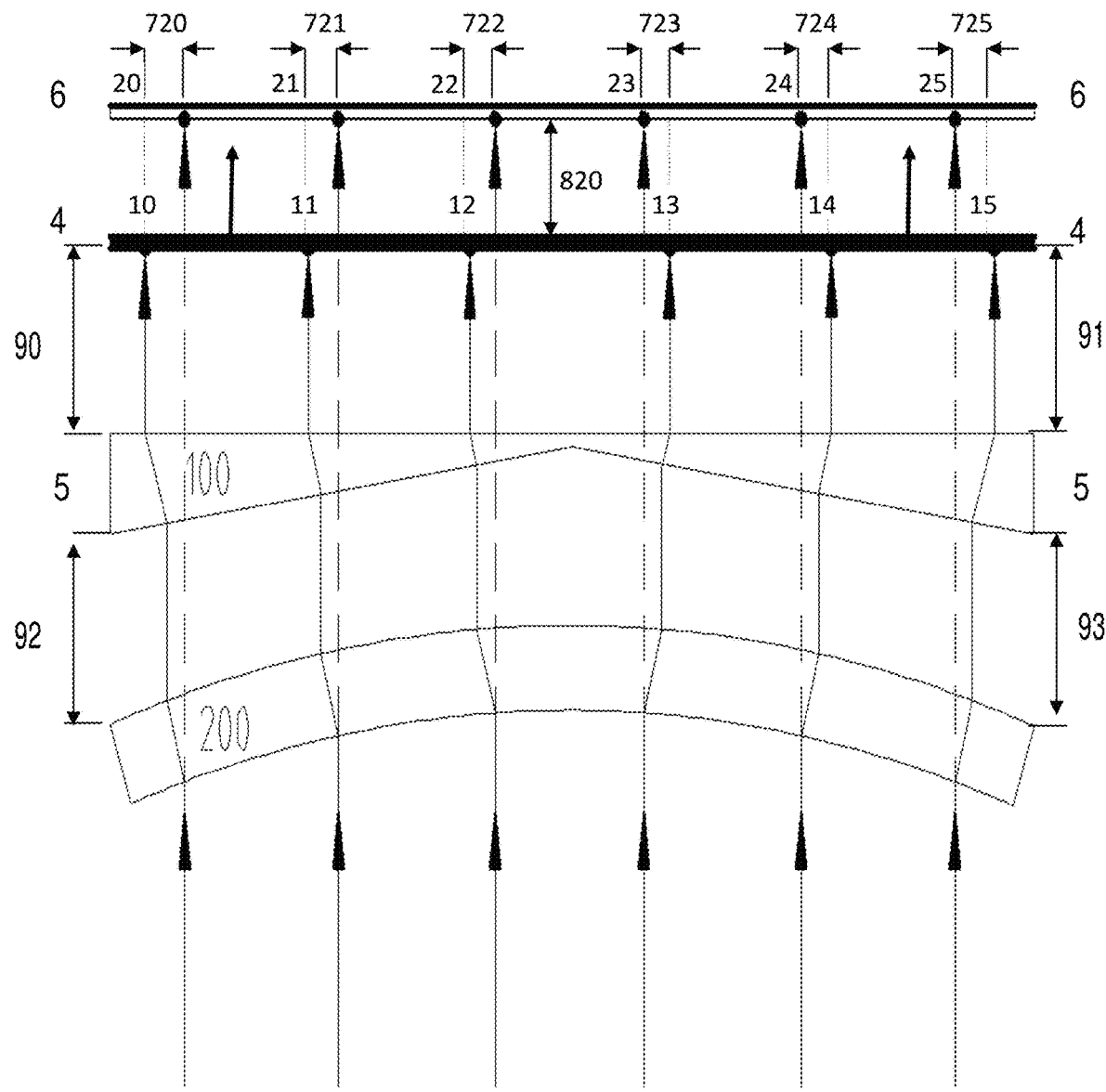
FIG. 16 illustrates a positive parallax hyperstereo viewing mode when viewing onto a conventional display screen through an embodiment of present invented optical stereoscopic display assembly which combines a central-vertex triangular prism and a curved lens that is evolved from FIGS. 6(c), 15.

Referring to FIG. 15, it illustrates a positive parallax hyperstereo viewing mode when viewing a 2D content on a conventional display screen 4 through optical elements (100, 101, 102, 103) in which the top optical element is a pair of triangular prisms (102, 112) and the bottom optical element is a pair of rectangular prisms (100, 110). The horizontal displacement (720, 721) to the right, (722, 723) to the left and backward vertical displacement 820 reflect the imaging points 20, 21 and 22, 23 on image screen 6 are refracted from the objective points 10, 11 and 12, 13 on display screen 4. Image screen 6 is located in the back of (or backward from) screen 4 resulting in backward vertical displacement 820. There are separation spaces 90 and 91 between the optical stereoscopic display assembly 5 and display screen 4, 92 and 93 between the top and bottom optical elements. The structured optical elements (100, 101, 102, 112) can be regarded as evolved from combination of the prisms in FIGS. 8 and 11. Due to superposition effect, it represents an enhanced positive parallax hyperstereo viewing experience with reduced images;

Referring to FIG. 16 and in this embodiment, the present invented optical stereoscopic display assembly 5 includes the top optical element, a central-vertex symmetrical triangular prism 100, and the bottom element, a concave cylindrical lens 200 of which the concave surface faces to viewer. When viewing a 2D content on a conventional display screen 4 through the present invented optical stereoscopic display assembly 5, the objective points 10, 11 and 12 on the left side of the display screen 4 have been horizontally displaced (720, 721, 722) to the right as shown by the imaging points 20, 21 and 22 on image screen 6, the objective points 13, 14 and 15 on the right side of display screen 4 have been horizontally displaced (723, 724, 725) to the left as shown by the imaging points 22, 23 and 24 on image screen 6. Image screen 6 is located in the back of (or backward from) screen 4 resulting in backward vertical displacement 820. There are separation spaces 90 and 91 between the optical stereoscopic display assembly 5 and the display screen 4, 92 and 93 between the top and bottom optical elements. The structure of the present invented stereoscopic display assembly 5 can be regarded as evolved from FIG. 15 by extending and connecting the optical elements (102, 112) and by replacing the optical elements (100, 110) with concave cylindrical lens 200 as shown in FIG. 6(*c*). As a result of the vertical displacement 820 to image screen 6, it separates binocular focus and convergence by moving the binocular convergence away from the display screen 4 along the advancing viewing direction and represents reduced images which fall in the back of (or backward from) display screen 4.

Figure 17:
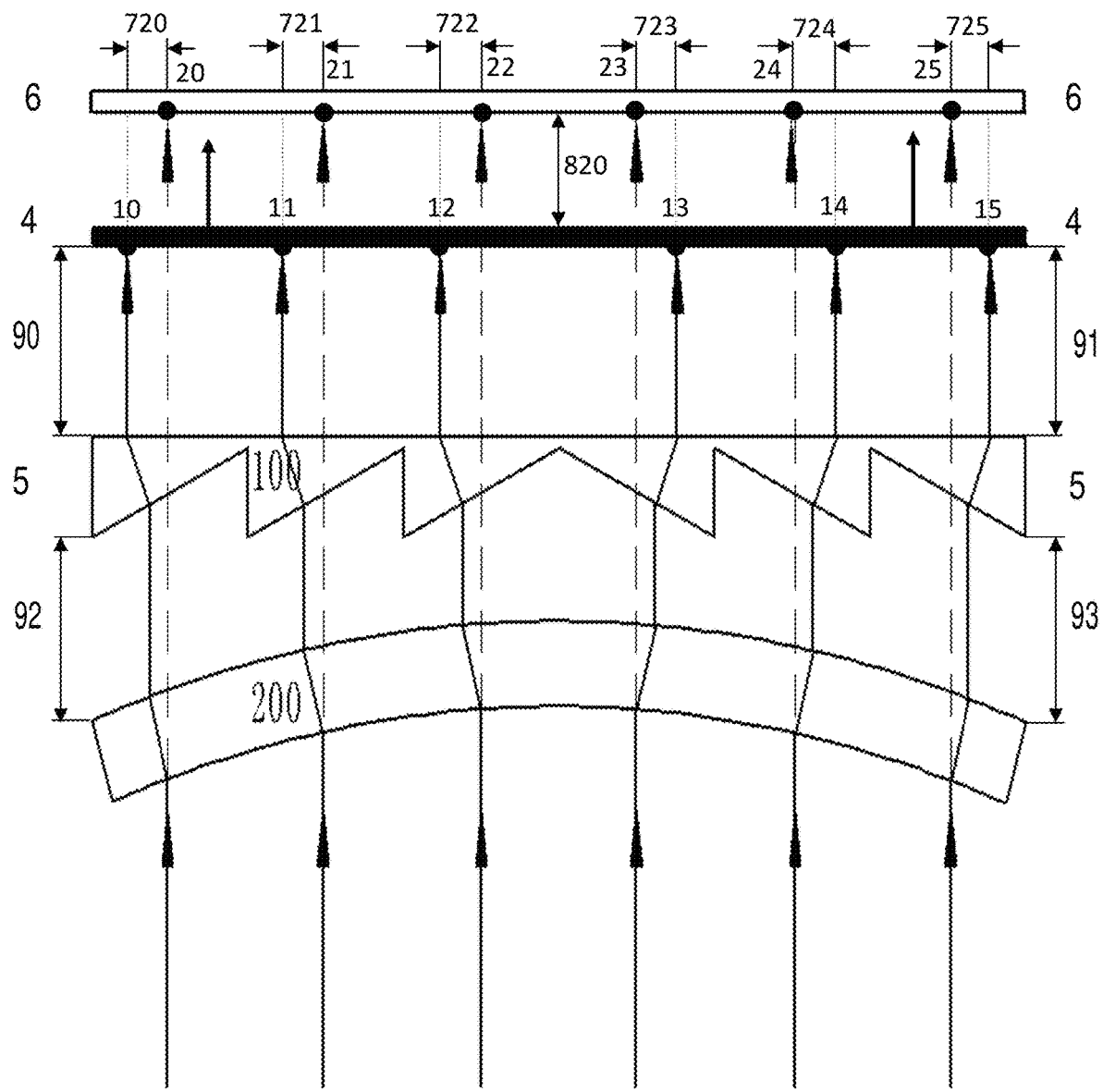
FIG. 17 illustrates a positive parallax hyperstereo viewing mode when viewing onto a conventional display screen through an embodiment of present invented optical stereoscopic display assembly which combines a central-vertex Fresnel prism and a curved lens that is evolved from FIG. 7(a), 16.

Referring to FIG. 17 and in this embodiment, the present invented optical stereoscopic display assembly 5 includes the top optical element, a central-vertex Fresnel prism 100, and the bottom optical element, a concave cylindrical lens 200 of which the concave surface faces to viewer. The structure of the present invented stereoscopic display assembly 5 can be regarded as evolved from FIG. 16 by replacing the central-vertex symmetrical triangular prism 100 with the central-vertex Fresnel prism 100 as shown in FIG. 5. By comparison to FIG. 16, this structure of optical elements also produces reduced images as indicated by the horizontal displacements 720, 721, and 722 vs. 723, 724, and 725. As a result of the vertical displacement to image screen 6, it separates binocular focus and convergence by moving the binocular convergence away from the display screen 4 along the advancing viewing direction and represents reduced images which fall in the back of (or backward from) display screen 4.

Figure 18:
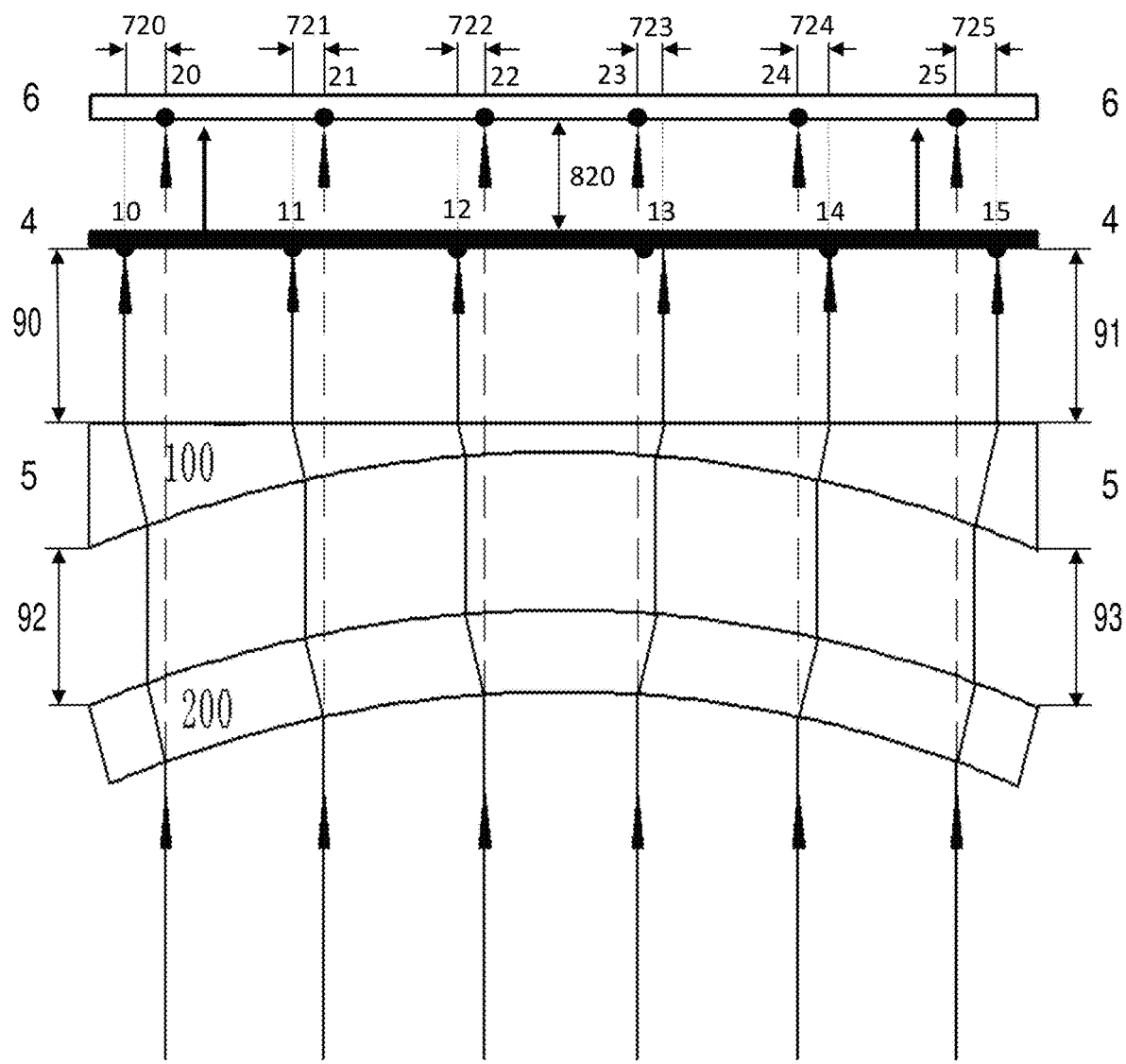
FIG. 18 illustrates a positive parallax hyperstereo viewing mode when viewing onto a conventional display screen through an embodiment of present invented optical stereoscopic display assembly which combines a plano-concave lens and a curved lens or a plano-concave cylindrical lens and a cylindrical lens that is evolved from FIGS. 7(a), 17.

Referring to FIG. 18 and in this embodiment, the present invented optical stereoscopic display assembly 5 includes the top optical element, a plano-concave lens or plano-concave cylindrical lens, and the bottom element, a concave lens 200 or concave cylindrical lens 200 of which the concave surface faces to viewer. The structure of the present invented stereoscopic display assembly 5 can be regarded as evolved from FIG. 17 by replacing the central-vertex Fresnel prism 100 by plano-concave lens or plano-concave cylindrical lens 102 as shown in FIG. 7(*a*). By comparison to FIG. 17, this structure of optical elements also produces reduced images as indicated by the horizontal displacements (720, 721, 722) vs. (723, 724, 725). As a result of the vertical displacement to image screen 6, it separates binocular focus and convergence by moving the binocular convergence away from the display screen 4 along the advancing viewing direction and represents reduced images which fall in the back of (or backward from) display screen 4.

Figure 19:
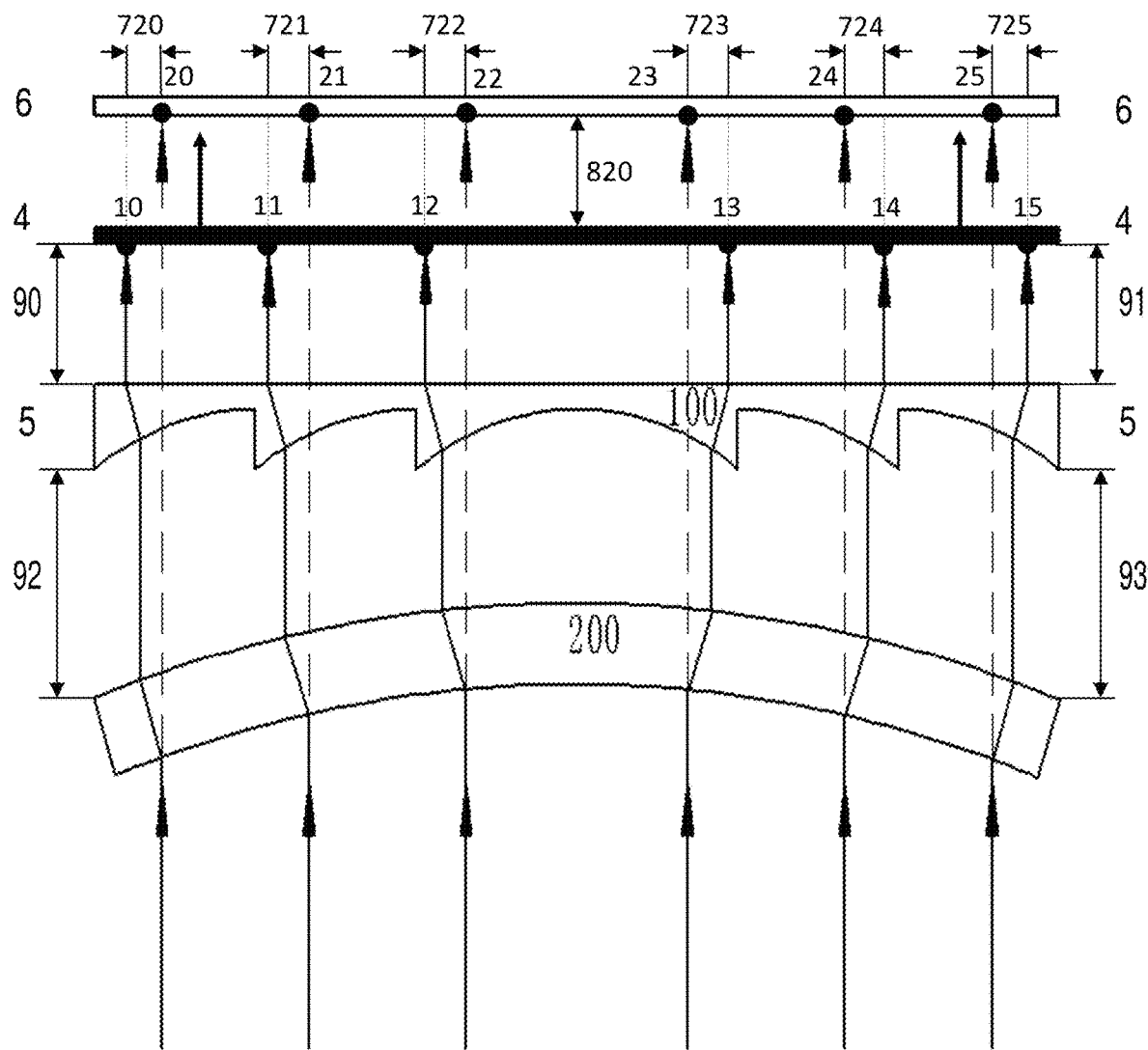
FIG. 19 illustrates a positive parallax hyperstereo viewing mode when viewing onto a conventional display screen through an embodiment of present invented optical stereoscopic display assembly which combines a concentric annular plano-concave lens and a curved lens or a concentric annular plano-concave cylindrical lens and a cylindrical lens that is evolved from FIGS. 7(a), 18.

Referring to FIG. 19 and in this embodiment, the present invented optical stereoscopic display assembly 5 includes the top optical element, a concentric annular plano-concave lens 100 or concentric annular plano-concave cylindrical lens 100, and the bottom element, a concave lens 200 or concave cylindrical lens 200 of which the concave surface faces to viewer. The structure of the present invented stereoscopic display assembly 5 can be regarded as evolved from FIG. 18 by replacing the central-vertex lens 100 or central-vertex cylindrical lens 100 by concentric annual plano-concave lens or plano-concave cylindrical lens 100 as shown in FIG. 7(*a*). By comparison to FIG. 17, this structure of optical elements also produces reduced images as indicated by the horizontal displacements (720, 721, 722) vs. (723, 724, 725). As a result of the vertical displacement to image screen 6, it separates binocular focus and convergence by moving the binocular convergence away from the display screen 4 along the advancing viewing direction and represents the reduced images which fall in the back of (or backward from) display screen 4.

To those embodiments as shown in FIGS. 13, 16, 17, 18 and 19, when viewing a 2D content on a conventional display screen 4 through the present invented optical stereoscopic display assembly 5, the objective points 10, 11 and 12 on the left side of the display screen 4 have been horizontally displaced (720, 721, 722) to the right as shown by the imaging points 20, 21 and 22 on image screen 6, the objective points 13, 14 and 15 on the right side of display screen 4 have been horizontally displaced (723, 724, 725) to the left as shown by the imaging points 22, 23 and 24 on image screen 6. Image screen 6 is located in the back of (or backward from) screen 4 resulting in backward vertical displacement 820. There are separation spaces 90 and 91 between the optical stereoscopic display assembly 5 and the display screen 4, 92 and 93 between the top and bottom optical elements. Due to the vertical displacement of the image screen 6, it separates binocular focus and convergence and eliminates the negative effect by zero parallax, induces 3D stereoscopic perception and produces reduced images. Accordingly, those embodiments provide positive parallax hyperstereo viewing mode as indicated in FIG. 4(a).

Figure 20:
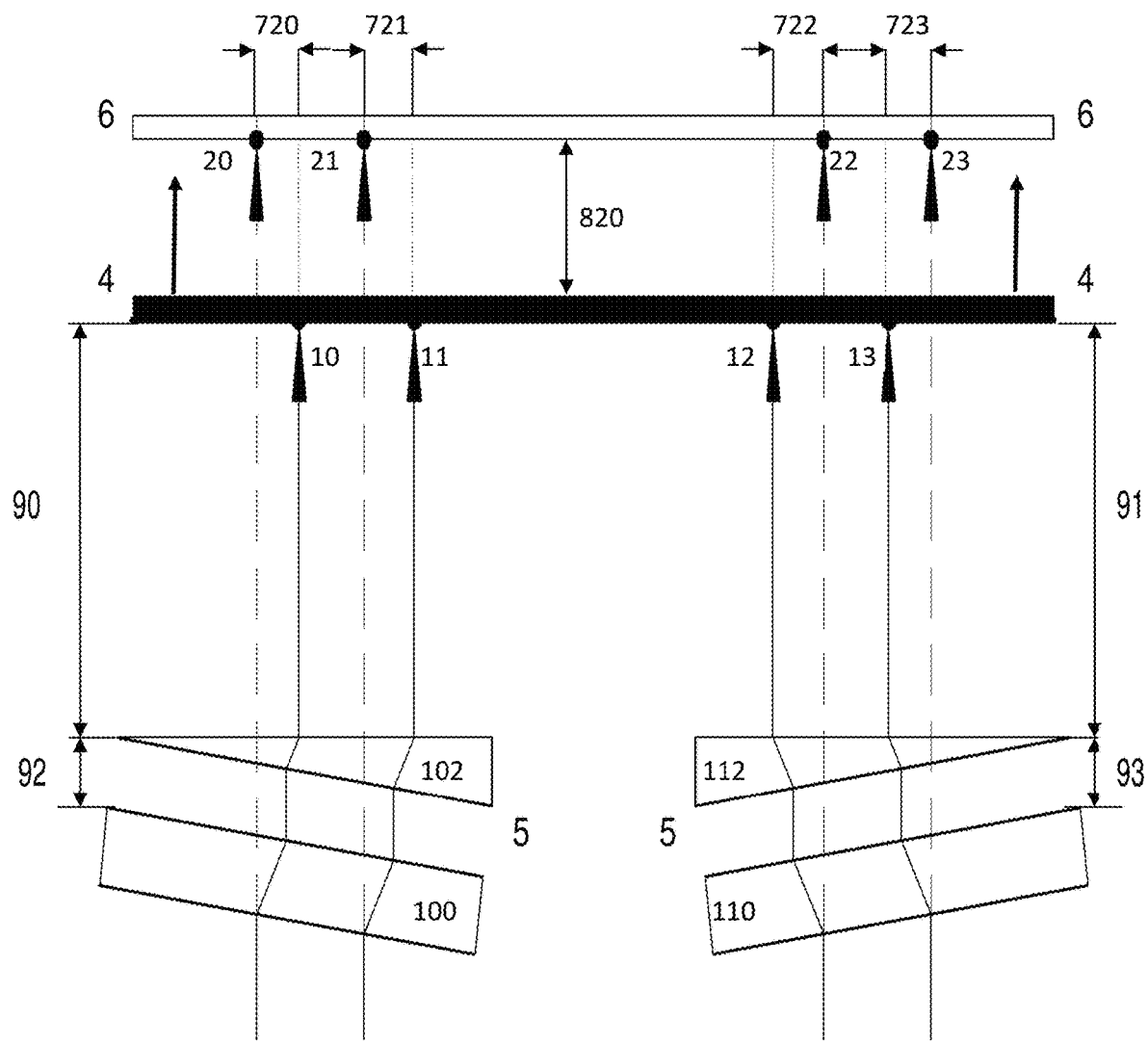
FIG. 20 illustrates a positive parallax hypostereo viewing mode with enhanced effect when viewing onto a conventional display screen through an optical assembly which combines the structured prisms in FIGS. 8, 12.

Referring to FIG. 20, it illustrates a positive parallax hypostereo viewing mode when viewing a 2D content on a conventional display screen 4 through optical elements (100, 101, 102, 103) in which the top optical element is a pair of triangular prisms (102, 112) and the bottom optical element is a pair of rectangular prisms (100, 110). The horizontal displacement (720, 721) to the left, (722, 723) to the right and backward vertical displacement 820 reflect the imaging points 20, 21 and 22, 23 on image screen 6 are refracted from the objective points 10, 11 and 12, 13 on the display screen 4. There are separation spaces 90 and 91 between the optical stereoscopic display assembly 5 and the display screen 4, 92 and 93 between the top and bottom optical elements. The structured optical elements (100, 101, 102 112) can be regarded as evolved from combination of the prisms in FIGS. 8 and 11. Due to superposition effect, it represents an enhanced positive parallax hypostereo viewing experience with enlarged images.

Figure 21:
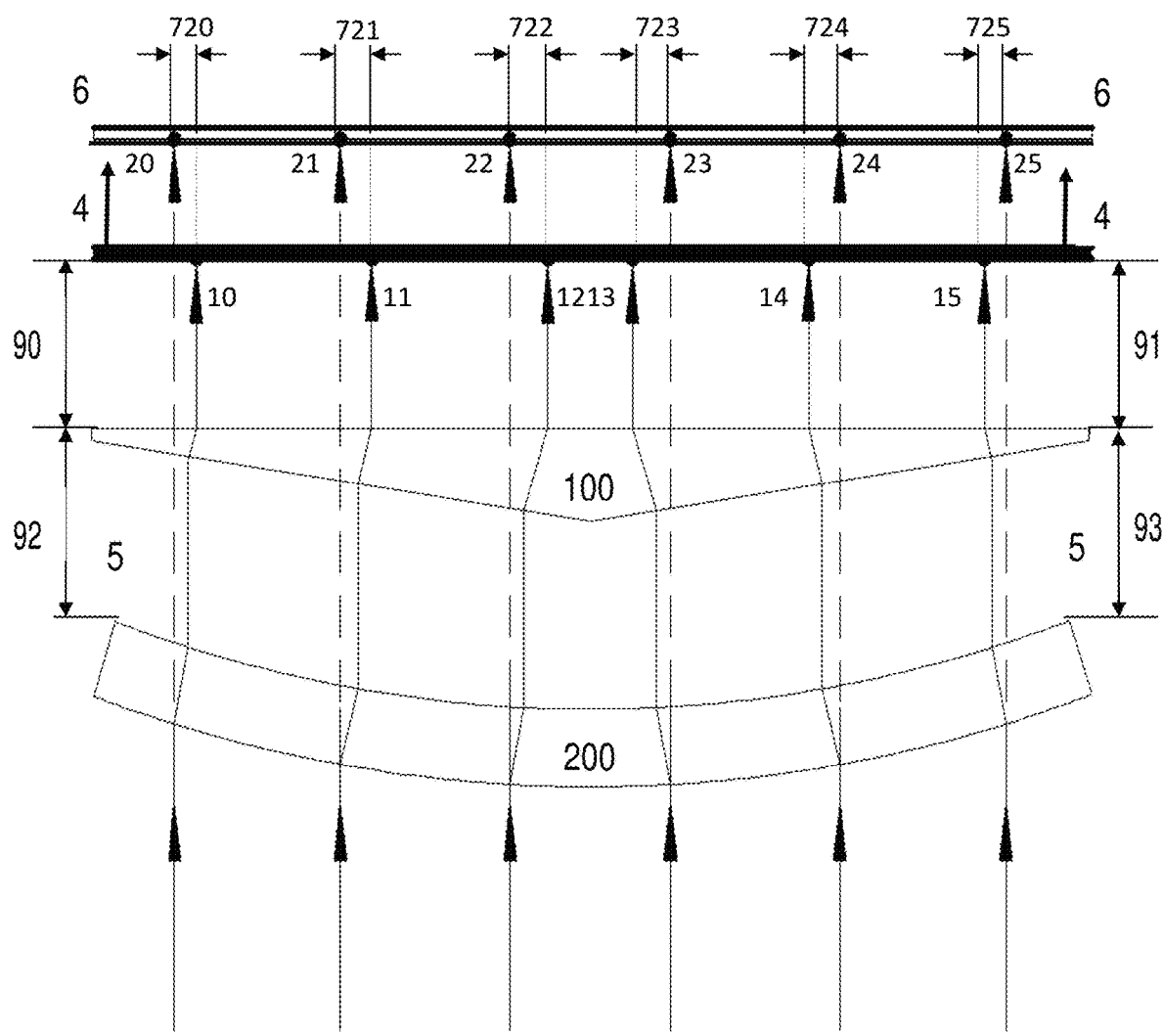
FIG. 21 illustrates a positive parallax hypostereo viewing mode when viewing onto a conventional display screen through an embodiment of present invented optical stereoscopic display assembly which combines a central-base triangular prism and a curved lens that is evolved from FIGS. 6(d), 20.

Referring to FIG. 21 and in this embodiment, the present invented optical stereoscopic display assembly 5 includes the top optical element, a central-base symmetrical triangular prism 100, and the bottom element, a convex cylindrical lens 200 of which the convex surface faces to viewer. When viewing a 2D content on a conventional display screen 4 through the present invented stereoscopic display assembly 5, the horizontal displacement (720, 721, 722) to the left and (723, 724, 725) to the right and vertical displacement 820 backward reflect the imaging points 20, 21, 22 and 23, 24, 25 on the image screen 6 are refracted from the objective points 10, 11, 12 and 13, 14, 15 by viewed through the present invented optical stereoscopic assembly 5. There are separation spaces 90 and 91 between the optical stereoscopic display assembly 5 and the display screen 4, 92 and 93 between the top and bottom optical elements. The structure of the present invented stereoscopic display assembly 5 can be regarded as evolved from FIG. 20 by extending and connecting the pair of triangular prisms 102 and 112 and by replacing the pair of rectangular prisms 100 and 110 as shown in FIG. 6(d). As a result of the vertical displacement 820 to image screen 6, it separates binocular focus and convergence by moving the binocular convergence away from the display screen 4 along the advancing viewing direction and represents enlarged images which fall in the back of (or backward from) display screen 4.

Figure 22:
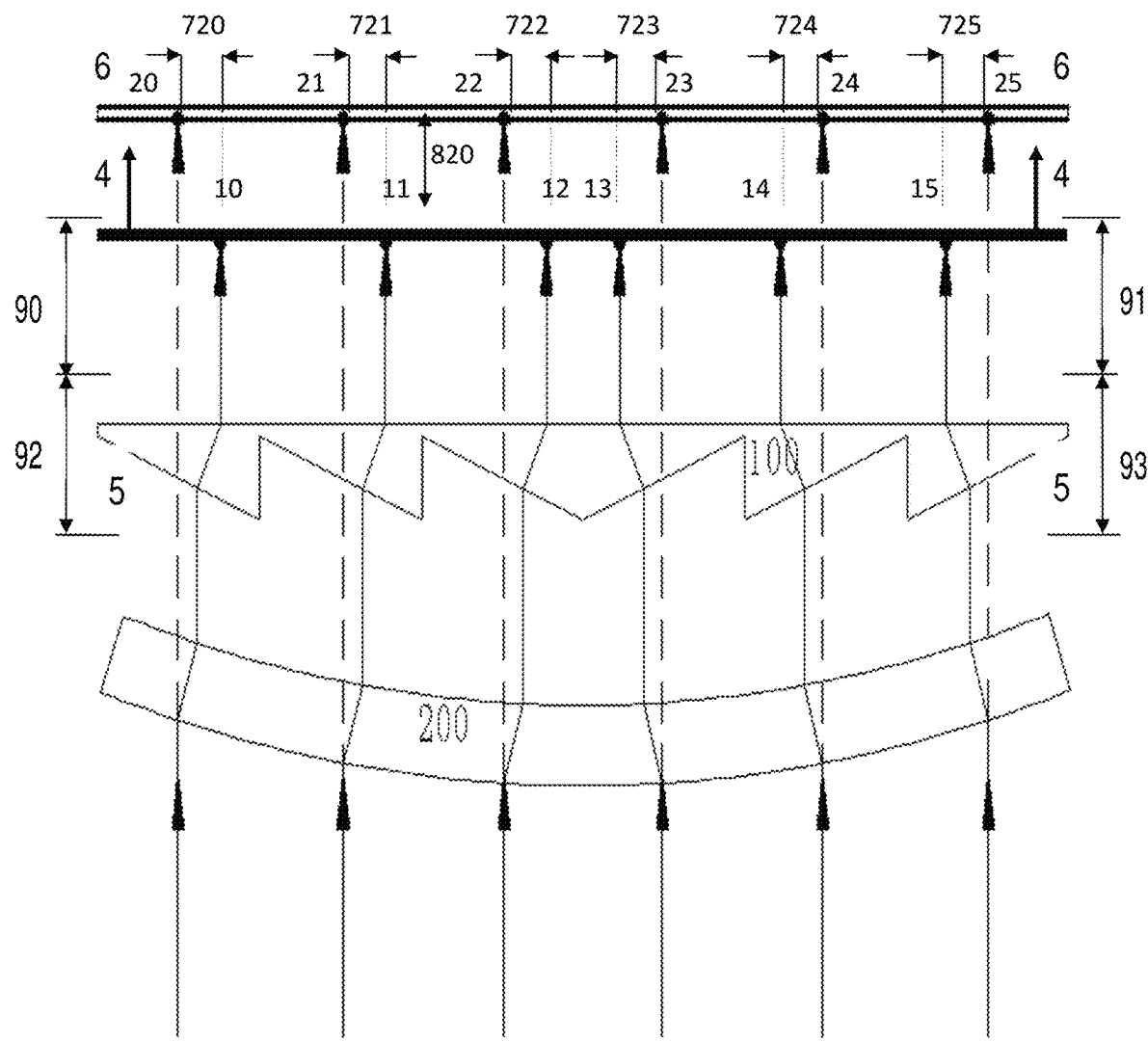
FIG. 22 illustrates a positive parallax hypostereo viewing mode when viewing onto a conventional display screen through an embodiment of present invented optical stereoscopic display assembly which combines a central-base Fresnel prism and a curved lens that is evolved from FIGS. 7(b), 21.

Referring to FIG. 22 and in this embodiment, the present invented optical stereoscopic display assembly 5 includes the top optical element, a central-base Fresnel prism 100, and the bottom element, a convex cylindrical lens 200 of which the convex surface faces to viewer. The structure of the present invented stereoscopic display assembly 5 can be regarded as evolved from FIG. 21 by replacing the central-base symmetrical triangular prism 100 by central-base Fresnel prism 101 as shown in FIG. 7(b). By comparison to FIG. 21, this structure of optical elements also produces enlarged images as indicated by the horizontal displacements (720, 721, 722) vs. (723, 724, 725). As a result of the vertical displacement 820 to image screen 6, it separates binocular focus and convergence by moving the binocular convergence away from the display screen 4 along the advancing viewing direction and represents enlarged images which fall in the back of (or backward from) display screen 4.

Figure 23:
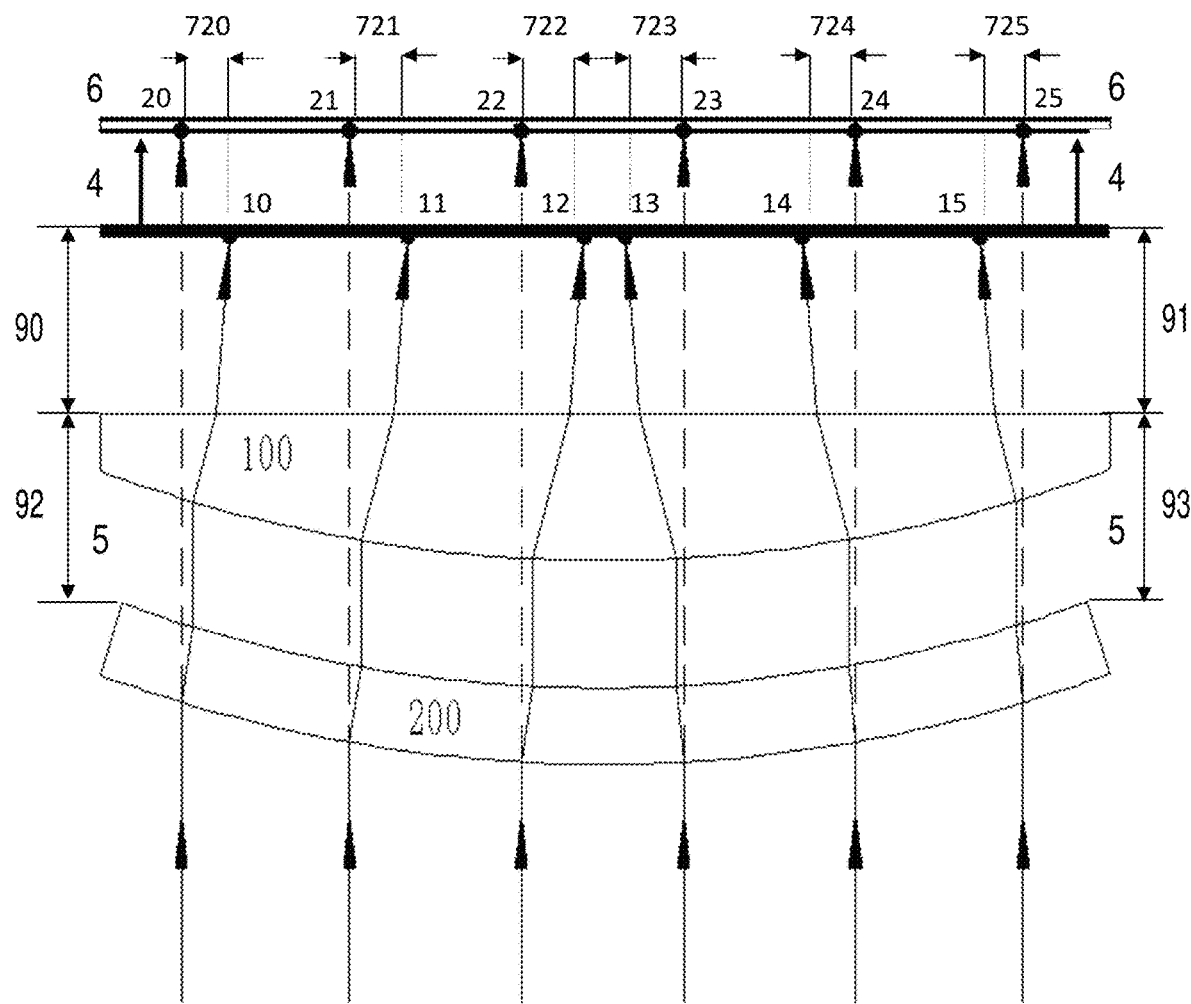
FIG. 23 illustrates a positive parallax hypostereo viewing mode when viewing onto a conventional display screen through an embodiment of present invented optical stereoscopic display assembly which combines a plano-convex lens and a curved lens or a plano-convex cylindrical lens and a cylindrical lens that is evolved from FIGS. 7(b), 22.

Referring to FIG. 23 and in this embodiment, the present invented optical stereoscopic display assembly 5 includes the top optical element, a plano-convex lens 100 or plano-convex cylindrical lens 100, and the bottom element, a convex lens 200 or convex cylindrical lens 200 of which the convex surface faces to viewer. The structure of the present invented stereoscopic display assembly 5 can be regarded as evolved from FIG. 22 by replacing the central-base Fresnel prism 101 by plano-convex lens 102 or plano-convex cylindrical lens 102 as shown in FIG. 7(b). By comparison to FIG. 22, this structure of optical elements also produces enlarged images as indicated by the horizontal displacements (720, 721, 722) vs. (723, 724, 725). As a result of the vertical displacement 820 to image screen 6, it separates binocular focus and convergence by moving the binocular convergence away from the display screen 4 along the advancing viewing direction and represents enlarged images which fall in the back of (or backward from) display screen 4.

Figure 24:
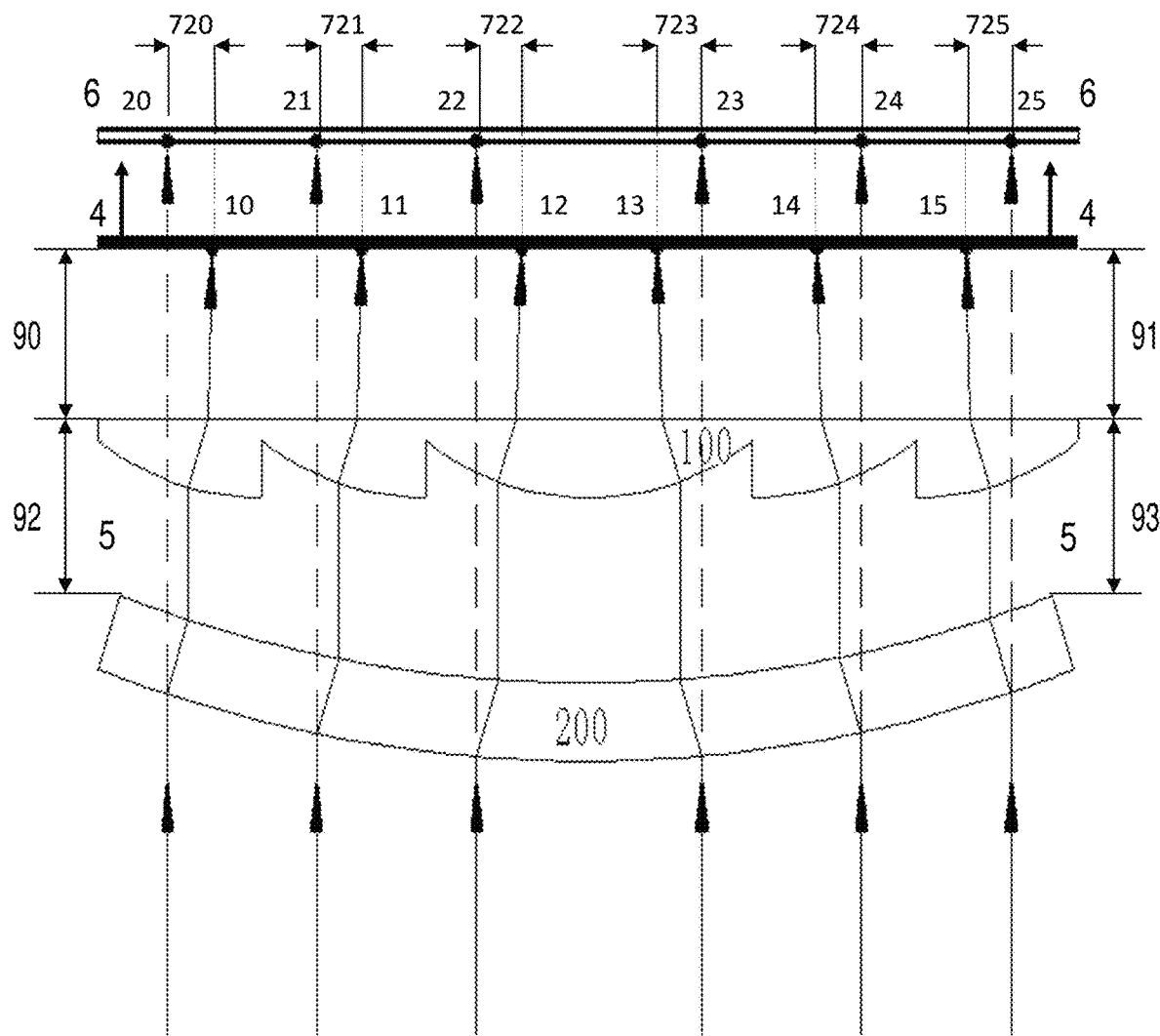
FIG. 24 illustrates a positive parallax hypostereo viewing mode when viewing onto a conventional display screen through an embodiment of present invented optical stereoscopic display assembly which combines a plano-Fresnel lens and a curved lens or a plano-Fresnel cylindrical lens and a cylindrical lens that is evolved from FIGS. 7(b), 23.

Referring to FIG. 24 and in this embodiment, the present invented optical stereoscopic display assembly 5 includes the top optical element, a concentric annular plano-convex lens 100 (also called plano-Fresnel lens) or concentric annular plano-convex cylindrical lens 100 (also called plano-Fresnel cylindrical lens), and the bottom element, a convex lens 200 or convex cylindrical lens 200 of which the convex surface faces to viewer. The structure of the present invented stereoscopic display assembly 5 can be regarded as evolved from FIG. 23 by replacing the plano-convex lens 102 or plano-convex cylindrical lens 102 by Fresnel lens 103 or Fresnel cylindrical lens 103 as shown in FIG. 7(b). By comparison to FIG. 23, this structure of optical elements also produces enlarged images as indicated by the horizontal displacements (720, 721, 722) vs. (723, 724, 725). As a result of the vertical displacement 820 to image screen 6, it separates binocular focus and convergence by moving the binocular convergence away from the display screen 4 along the advancing viewing direction and represents enlarged images which fall in the back of (or backward from) display screen 4.

To those embodiments as shown in FIGS. 14, 20, 21, 22 and 23, when viewing a 2D content on a conventional display screen 4 through the present invented stereoscopic display assembly 5, the spatial displacement (720, 721, 722) to the left and (723, 724, 725) to the right in horizontal and 820 backward in vertical reflect the imaging points 20, 21, 22 and 23, 24, 25 on the image screen 6 are refracted from the objective points 10, 11, 12 and 13, 14, 15 by viewed through the present invented optical stereoscopic assembly 5. There are separation spaces 90 and 91 between the optical stereoscopic display assembly 5 and the display screen 4, 92 and 93 between the top and bottom optical elements. Due to the vertical displacement of the image screen 6, it separates binocular focus and convergence and eliminates the negative effect by zero parallax, induces 3D stereoscopic perception and produces enlarged images. Accordingly, those embodiments provide positive parallax hypostereo viewing mode as illustrated in FIG. 4(c).

Figure 25:
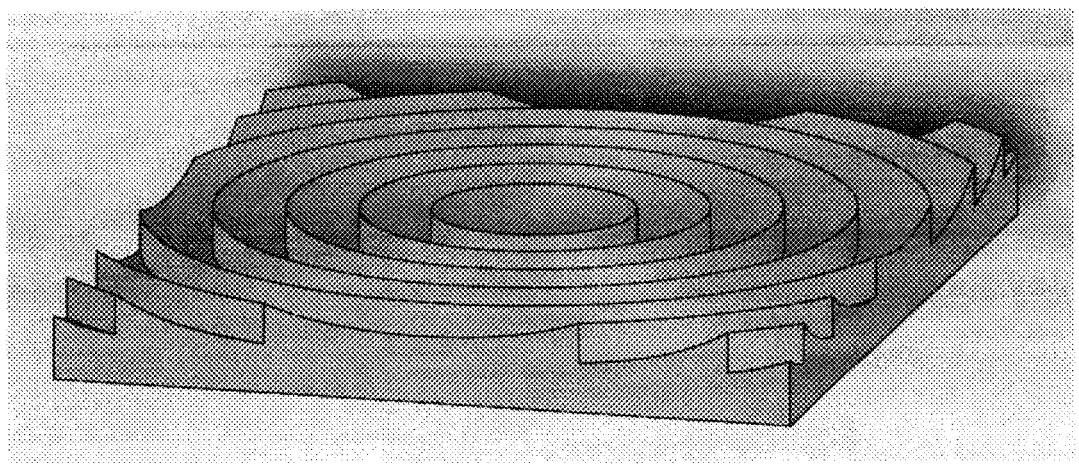
FIG. 25 refers to three-dimensional sketch of a concentric annular plano-concave lens.
Figure 26:
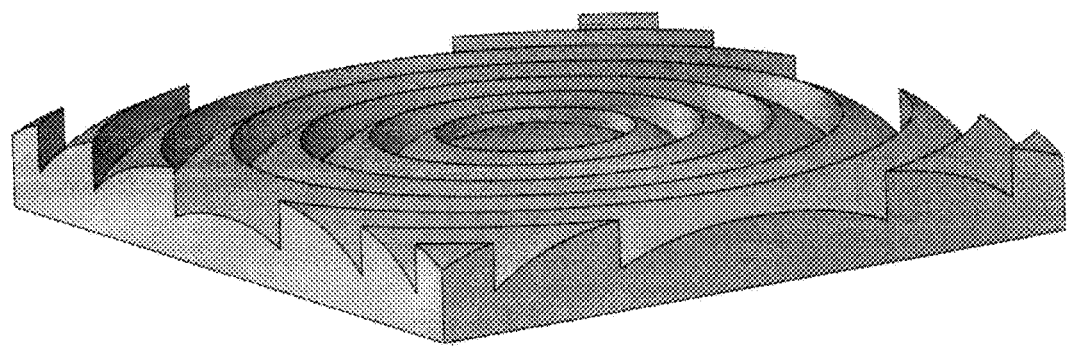
FIG. 26 refers to three-dimensional sketch of a concentric annular plano-convex lens, known as plano-Fresnel lens.
Figure 27:
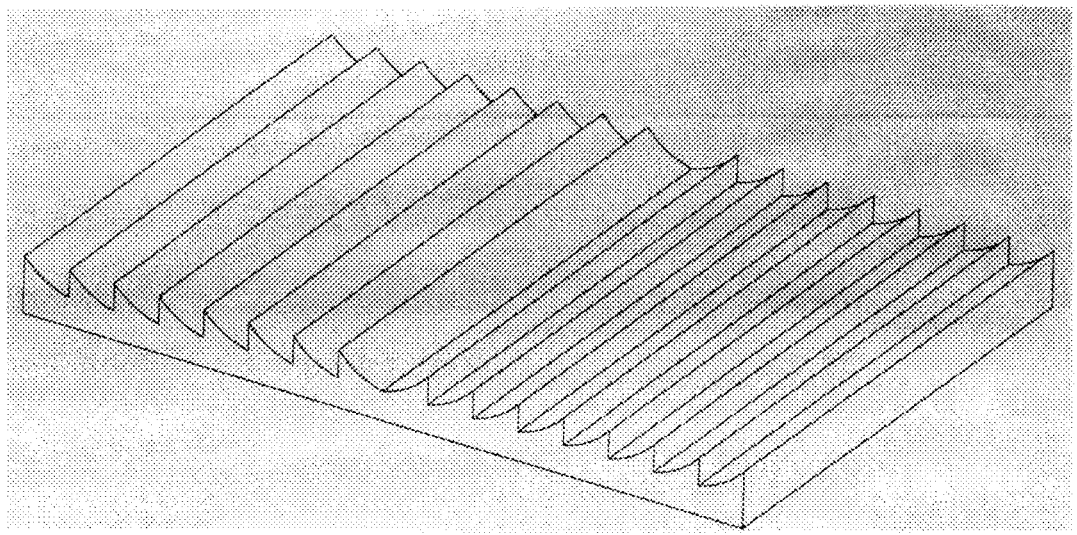
FIG. 27 refers to three-dimensional sketch of a concentric annular plano-concave cylindrical lens.
Figure 28:
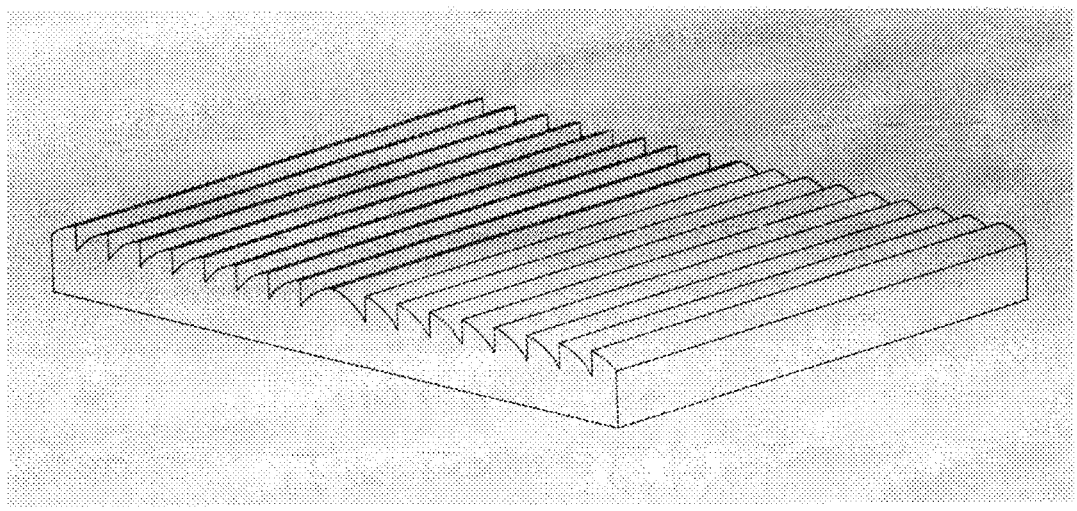
FIG. 28 refers to three-dimensional sketch of a concentric annular plano-convex cylindrical lens, known as plano-Fresnel cylindrical lens.

FIG. 25 is three-dimensional sketch of the concentric annular plano-concave lens as indicated hereinbefore; FIG. 26 is three-dimensional sketch of the concentric annular plano-convex lens, known as Fresnel lens, as indicated hereinbefore; FIG. 27 is three-dimensional sketch of the concentric annular plano-concave cylindrical lens, as indicated hereinbefore; FIG. 28 is three-dimensional sketch of the concentric annular plano-convex cylindrical lens, known as Fresnel cylindrical lens, as indicated hereinbefore;

FIG. 29 illustrates present invented optical stereoscopic display assembly in a large scale, which is structured by numbers of small optical stereoscopic display assemblies repeated as array in two-dimensional direction.

As shown in FIG. 2, the present invented glasses-free optical stereoscopic display assembly 5 is comprised of the combination of optical elements, such as optical prisms, spherical and cylindrical lenses, other symmetrical lens, special optical elements, etc. When viewing a 2D content on a display screen 4 by naked eyes, the eyes focus and converge onto display screen 4. The two framed images of 2D content on the left and right retinas appear identical; the brain produces a zero parallax 2D vision. When viewing a 2D content on a display screen 4 through the present invented optical stereoscopic display assembly 5, the refraction by optical elements makes the image screen 6 spatially displaced, which separates the binocular focus and convergence by moving the binocular convergence away from screen plane 4 along the advancing viewing direction. While focus onto the display screen 4, the two framed images of the 2D content onto the left and right retinas contain minute differences, causing the brain to combine and melt the two images to perceive 3D stereoscopic vision with specific viewing mode as described in FIGS. 4(a), 4(b), 4(c), 4(d). For commercial applications, the optical stereoscopic display assembly should be as thin as possible, high refractive optical materials should be selected. However, high refractive optical elements are prone to dispersion. In order to minimize the effect of dispersion, by technical means, to combine and mix the different refractive optical elements and to keep asymmetry. Furthermore, when viewing a 2D content on a conventional display screen through the present invented optical 3D stereoscopic display assembly, by comparison to naked eye viewing, it enhances brightness, color vividness and screen clarity. That is due to the impact of background light and stray-light onto the display screen is greater than onto the optical display assembly, as optical elements feature of separating and filtering the background light and stray-light.

The embodiments hereinbefore, by exchange the sides of the optical element which is located as the nearest one to the display screen 4, it affects the sense of spatial depth and stereoscopic perception; by adjusting the separation space (90, 91), it also affects the sense of spatial depth and stereoscopic perception; by modifying the separation space (92, 93, 94, 95, 96, 97), the affection to the sense of spatial depth and stereoscopic perception is altered in relatively small scale. Generally, within a certain adjustment range, by decreasing the separation space (90, 91), the sense of spatial depth is enhanced while the sense of stereoscopic perception is reduced; by increasing the separation space (90, 91), the sense of spatial depth reduced while the sense of stereoscopic perception is enhanced. Moreover, when viewing a 2D content on a fixed placed conventional display screen, such as the screen for movie, TV, computer, gaming console, billboard . . . and so on, the optical elements of the present invented optical stereoscopic display assembly can be selected from prisms, spherical and cylindrical lenses, other symmetrical lenses; when viewed a 2D content on a non-fixed placed conventional display screen such as the screen for tablet, portable game console, portable device, mobile phone . . . and so on, the optical elements of the present invented optical stereoscopic display assembly can only be selected from spherical lenses or other symmetrical lenses, It is due to the viewer can choose either the long side or short side of the screen to be the base, while the cylindrical lenses and prisms are with specific orientations. Moreover, the parallax can only occur in the left and right (horizontal) direction but the up and down (vertical) direction. Thus, the selection of optical elements for non-fixed placed display screen maintains certain rules or restrictions.

The embodiments hereinbefore, as examples, the present invented glasses-free optical stereoscopic display assembly 5 is a combination of known optical elements as long as such combinations can perceive the desired 3D stereoscopic vision when viewed a 2D content. The present invention also includes, but is not limited to, methods of making and methods of using the optical stereoscopic display assembly 5 for providing 3D stereoscopic vision by viewing a 2D content on a conventional display screen.

The present invention also includes, but is not limited to, methods of making and methods of using the optical assemblies for providing 3D stereoscopic vision when viewing 2D content on a conventional display screen. It is preferred that the optical assemblies provide the positive parallax hyperstereo viewing mode as illustrated in FIG. 4(a), and in turns, the positive parallax hypostereo viewing mode as illustrated in FIG. 4(c).

The particulars shown hereinbefore are by way of example and for purposes of illustrative discussion of the invention only and are presented in the cause of providing what is believed to be the most useful and readily understood description of the principles and conceptual aspects of the invention. In this regard, no attempt is made to show structural details of the invention in more detail than is necessary for the fundamental understanding of the invention. The description taken with the drawings make apparent to those skilled in the art how the several forms of the invention may be embodied in practice. It is understood that the present invention as described and claimed herein can be used for many additional purposes, therefore the invention is within the scope of other fields and uses and not so limited. The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled.

What is claimed is:

1. An optical stereoscopic display assembly comprising a conventional display screen and an optical assembly, when an ordinary 2D image shown on the conventional display screen is viewed through the optical assembly a viewer perceives a 3D stereoscopic vision wherein:

(a) the optical assembly is comprised of one or more optical elements stacked and lined up along a viewing sight line wherein:
  a) the optical elements are selected from prisms, spherical and cylindrical lenses, Fresnel lenses, other symmetrical lenses or a combination thereof for a fixed placed display screen;
  b) the optical elements are selected from the spherical and Fresnel lenses, and the other symmetrical lenses or a combination thereof for a non fixed placed display screen;
  c) Refraction of the optical elements deflects viewing pathways causing the 2D image a spatial displacement and introducing spatial parallax;
(b) the optical assembly causes a perceived image screen which is shifted backward or forward a spatial displacement from the conventional display screen wherein:
  a) the spatial displacement of the perceived image screen causes a separation of binocular focus and convergence by moving the binocular convergence away from the conventional display screen along the advancing viewing direction;
  b) the separated binocular focus and convergence induce the left eye of the viewer to perceive a left eye offset image of the 2D image which appears to be located at a different spatial location than an actual physical location of the 2D image shown on the conventional display screen;
  c) the separated binocular focus and convergence induce the right eye of the viewer to perceive a right eye offset image of the 2D image which appears to be located at a different spatial location than the actual physical location of the 2D image shown on the conventional display screen;
  d) a minute spatial difference exists between the location of the perceived left eye offset image by the left eye and the other location of the perceived right eye offset image by the right eye;
(c) the perceived left eye offset image and the perceived right eye offset image induced by the stereoscopic display assembly cause the perception of 3D stereoscopic vision which fall within at least one of the following viewing modes wherein:
  a) a reduced 3D stereoscopic image appears behind the conventional display screen as a positive parallax hyperstereo viewing mode;
  b) an enlarged 3D stereoscopic image appears behind the conventional display screen as a positive parallax hypostereo viewing mode;
  c) a reduced 3D stereoscopic image appears in front of the conventional display screen as a negative parallax hyperstereo viewing mode;
  d) an enlarged 3D stereoscopic image appears in front of the conventional display screen as a negative parallax hypostereo viewing mode.

2. The optical stereoscopic display assembly of claim 1 wherein the perceived left eye offset image and the perceived right eye offset image induced by the stereoscopic display assembly cause a perception of 3D stereoscopic vision which fall within the positive parallax hyperstereo viewing mode.

3. The optical stereoscopic display assembly of claim 1 wherein the perceived left eye offset image and the perceived right eye offset image induced by the stereoscopic display assembly cause a perception of 3D stereoscopic vision which fall within the positive parallax hypostereo viewing mode.

4. The optical stereoscopic display assembly of claim 1 wherein the optical assembly is comprised of at least one optical element wherein refraction of the optical element induce a spatial parallax which eliminate a negative effect to 3D stereoscopic perception by zero parallax so as to enhance the viewer's sense of spatial perception such as space perspective, relative location and relative motion.

5. The optical stereoscopic display assembly of claim 1 wherein the at least one optical element is an optical element selected from a group consisting of optical prisms, spherical and cylindrical lenses, Fresnel prisms and lenses, other symmetrical lenses, and a combination thereof.

6. The optical stereoscopic display assembly of claim 1 wherein the at least one optical element is one of more prisms or lenses separated from others by a separation space.

7. The optical stereoscopic display assembly of claim 1 wherein the optical assembly-includes a spatial parallax which eliminate a negative effect to 3D stereoscopic perception by zero parallax and cause a viewer to perceive an ordinary 2D image shown on the conventional display screen as a 3D stereoscopic vision.

8. The optical stereoscopic display assembly of claim 1 wherein the optical assembly is separated from the conventional display screen by a separation space.

9. The optical stereoscopic display assembly of claim 1 provides continuous extended spatial depth with no loss to resolution, no distortion or ghost effect and no affection to brightness and color vividness.

10. The optical stereoscopic display assembly of claim 1 provides sufficient level of convergence so as to cause a viewer to perceive an ordinary 2D image shown on the conventional display screen as a 3D stereoscopic vision without eyestrain.

11. The optical stereoscopic display assembly of claim 1 wherein a large scale display can be structured by a plurality of the optical stereoscopic display assemblies repeatedly placed in a two-dimensional coordinate system.

* * * * *